United States Patent
Hosono et al.

(10) Patent No.: US 11,007,592 B2
(45) Date of Patent: May 18, 2021

(54) HEAT EXCHANGER AND METHOD FOR PRODUCING SAME

(71) Applicant: DENSO AIRCOOL CORPORATION, Azumino (JP)

(72) Inventors: Takefumi Hosono, Kariya (JP); Akira Yanagida, Kariya (JP); Takeshi Iguchi, Kariya (JP); Haruki Shingo, Kariya (JP); Naoki Satou, Matsumoto (JP)

(73) Assignee: DENSO AIRCOOL CORPORATION, Azumino (JP)

( * ) Notice: Subject to any disclaimer, the term of this patent is extended or adjusted under 35 U.S.C. 154(b) by 362 days.

(21) Appl. No.: 15/747,486

(22) PCT Filed: Jul. 27, 2016

(86) PCT No.: PCT/JP2016/071974
§ 371 (c)(1),
(2) Date: Jan. 25, 2018

(87) PCT Pub. No.: WO2017/018438
PCT Pub. Date: Feb. 2, 2017

(65) Prior Publication Data
US 2018/0214963 A1    Aug. 2, 2018

(30) Foreign Application Priority Data

Jul. 30, 2015    (JP) .............................. JP2015-150574
Feb. 11, 2016    (JP) .............................. JP2016-024232

(51) Int. Cl.
*B23K 1/19*      (2006.01)
*B23K 1/002*      (2006.01)
(Continued)

(52) U.S. Cl.
CPC ............... *B23K 1/19* (2013.01); *B23K 1/002* (2013.01); *B23K 1/0012* (2013.01); *B23K 1/14* (2013.01);
(Continued)

(58) Field of Classification Search
CPC .......... F25B 39/00; F28D 1/0477; F28D 1/07; F28F 9/26; F28F 21/084; F28F 21/085;
(Continued)

(56) References Cited

U.S. PATENT DOCUMENTS 230,694 A * 8/1880 La Vergne ................ F28F 9/26
                                                  165/117
1,840,495 A * 1/1932 Rosenfeld ................ F28D 7/08
                                                  165/171
(Continued)

FOREIGN PATENT DOCUMENTS

EP            2042825 A1    4/2009
JP          2001062587 A    3/2001
(Continued)

*Primary Examiner* — Tho V Duong
*Assistant Examiner* — Raheena R Malik
(74) *Attorney, Agent, or Firm* — Harness, Dickey & Pierce, P.L.C.

(57) ABSTRACT

A heat exchanger includes multiple aluminum heat transfer tubes through which a heat medium flows, and multiple aluminum connection pipes brazed to end portions of the heat transfer tubes. A heat equalizing member formed of a heat conductor is disposed to be in contact with at least two of the connection pipes and be capable of transferring heat therebetween. A method for producing the heat exchanger includes brazing the heat transfer tubes to the connection pipes in a state where the heat equalizing member is in contact with the at least two of the connection pipes.

5 Claims, 24 Drawing Sheets

(51) Int. Cl.
*F28F 21/08* (2006.01)
*F28D 1/047* (2006.01)
*F25B 39/00* (2006.01)
*B23K 1/14* (2006.01)
*B23K 1/00* (2006.01)
*B23K 31/02* (2006.01)
*B23K 35/02* (2006.01)
*F28F 9/26* (2006.01)
*B23K 101/06* (2006.01)
*B23K 103/10* (2006.01)
*B23K 103/12* (2006.01)
*B23K 101/14* (2006.01)

(52) U.S. Cl.
CPC .......... *B23K 31/02* (2013.01); *B23K 35/0222* (2013.01); *F25B 39/00* (2013.01); *F28D 1/047* (2013.01); *F28D 1/0477* (2013.01); *F28F 9/26* (2013.01); *F28F 21/084* (2013.01); *F28F 21/085* (2013.01); *B23K 2101/06* (2018.08); *B23K 2101/14* (2018.08); *B23K 2103/10* (2018.08); *B23K 2103/12* (2018.08); *F28F 2275/04* (2013.01); *F28F 2275/045* (2013.01)

(58) Field of Classification Search
CPC .. F28F 2275/04; F28F 2275/045; B23K 1/19; B23K 1/0012; B23K 1/002; B23K 1/14; B23K 31/02; B23K 35/0222; B23K 2103/10; B23K 2103/12; B23K 2101/06; B23K 2101/14
USPC ........................................................ 165/144
See application file for complete search history.

(56) References Cited

U.S. PATENT DOCUMENTS

| | | | | |
|---|---|---|---|---|
| 1,931,467 A * | 10/1933 | Young | ................... | F28D 1/0477 165/149 |
| 2,177,995 A * | 10/1939 | Ramsaur | ............... | B23K 1/0012 228/219 |
| 2,267,315 A * | 12/1941 | Stikeleather | ............... | F28F 9/26 29/890.043 |
| 2,301,433 A * | 11/1942 | McElgin | ................ | F28D 1/0477 165/71 |
| 3,833,986 A * | 9/1974 | DeCicco | ............... | B23K 1/0012 29/890.047 |
| 3,849,854 A * | 11/1974 | Mattioli | ............... | B21D 53/085 29/890.07 |
| 3,877,518 A * | 4/1975 | Dreksler | ................ | B21D 39/04 165/150 |
| 3,945,554 A * | 3/1976 | Osterkorn | ............ | B23K 1/0012 228/111.5 |
| 4,050,881 A * | 9/1977 | Watson, Jr. | .......... | B23K 1/0012 432/5 |
| 4,053,014 A * | 10/1977 | Neff | ..................... | B23K 1/0012 165/150 |
| 4,054,239 A * | 10/1977 | Watson, Jr. | .......... | B23K 1/0012 228/183 |
| 4,089,368 A * | 5/1978 | Bell, Jr. | .................. | F25B 39/02 165/139 |
| 4,186,474 A * | 2/1980 | Hine | .................... | B21D 53/085 29/890.047 |
| 4,196,923 A * | 4/1980 | Zimmerli | .................. | C09J 5/02 228/119 |
| 4,210,199 A * | 7/1980 | Doucette | ................. | F28D 7/106 165/143 |
| 4,531,577 A * | 7/1985 | Humpolik | ............... | F28F 9/167 165/150 |
| 4,676,305 A * | 6/1987 | Doty | ..................... | F28D 7/1653 165/158 |
| 4,995,453 A * | 2/1991 | Bartlett | ................... | F25B 39/00 165/150 |
| 5,024,587 A * | 6/1991 | Maurer | ................... | F04B 7/045 222/333 |
| 5,158,134 A * | 10/1992 | Mongia | ................ | F28D 1/0477 165/149 |
| 5,211,221 A * | 5/1993 | Lease | ..................... | F28F 9/162 156/294 |
| 5,219,023 A * | 6/1993 | Kadle | .................. | B60H 1/3227 165/110 |
| 5,224,537 A * | 7/1993 | Potier | ................... | F28D 1/0475 165/149 |
| 5,617,992 A * | 4/1997 | Huddleston | ............ | B23K 1/203 228/183 |
| 6,705,391 B1* | 3/2004 | Lewin | ....................... | F28F 1/32 165/133 |
| 7,028,764 B2* | 4/2006 | Reagen | ................... | F25B 39/02 165/144 |
| 8,118,085 B2* | 2/2012 | Cramer | ..................... | F28F 1/26 165/144 |
| 2003/0121647 A1* | 7/2003 | Roo | ..................... | B23K 1/0012 165/150 |
| 2005/0000238 A1* | 1/2005 | Schmid | ................... | F25B 39/02 62/272 |
| 2013/0199763 A1* | 8/2013 | Yanagida | ........... | B23K 35/3603 165/177 |
| 2016/0231072 A1* | 8/2016 | Pohlman | ................ | F28F 21/087 |

FOREIGN PATENT DOCUMENTS

| | | |
|---|---|---|
| JP | 2001334388 A | 12/2001 |
| JP | 2007018157 A | 1/2007 |
| JP | 2008020150 A | 1/2008 |
| JP | 2009068805 A | 4/2009 |
| JP | 2011025249 A | 2/2011 |
| JP | 2014153006 A | 8/2014 |
| JP | 2015078789 A | 4/2015 |
| JP | 2017122549 A | 7/2017 |

* cited by examiner

HEAT EXCHANGER AND METHOD FOR PRODUCING SAME

CROSS REFERENCE TO RELATED APPLICATIONS

This application is a U.S. National Phase Application under 35 U.S.C. 371 of International Application No. PCT/JP2016/071974 filed on Jul. 27, 2016 and published in Japanese as WO 2017/018438 A1 on Feb. 2, 2017. This application is based on and claims the benefit of priority from Japanese Patent Applications No. 2015-150574 filed on Jul. 30, 2015, and No. 2016-024232 filed on Feb. 11, 2016. The entire disclosures of all of the above applications are incorporated herein by reference.

TECHNICAL FIELD

The present disclosure relates to a heat exchanger in which a heat transfer tube and a connection pipe are brazed together, and a method for producing the heat exchanger.

BACKGROUND ART

Up to now, a cross fin tube heat exchanger is formed of a copper heat transfer tube, and the heat transfer tube is partially brazed with phosphorus copper solder with the use of a line burner facility or the like. In recent years, in order to reduce a material cost, an aluminum tube is increasingly used for the heat transfer tube and is brazed with an Al—Si solder. In the case of the aluminum tube, melting points of a base metal and a brazing material are close to each other, so it is difficult to perform brazing without melting the base material.

Further, the connection pipes of various shapes are used in the cross fin tube heat exchanger. Therefore, even if the cross fin tube heat exchanger is uniformly heated by, for example, a line burner, a temperature of a part being brazed varies by position because heat capacities of the respective connection pipes are different, or because influences of burner flame on the respective connection pipes are different.

When the heat exchanger made of aluminum is brazed by the line burner or the like, brazing may not be easily performed due to the temperature variation.

In particular, when three or more rows of heat transfer tubes are placed in a depth direction of the heat exchanger, the influence of the flame on the heat transfer tube in a center row is lower than that on the heat transfer tubes in both side rows. Therefore, the temperature variation in the parts being brazed becomes wide.

For that reason, in Patent Literature 1, a method using a low-melting point brazing material such as Zn or Zn—Al has been proposed.

In the conventional art of Patent Literature 1, the brazing material is much lower in electric potential than the base material, and thus the brazing material is corroded preferentially. Therefore, the brazed part needs to be coated. For example, a heat shrinkable tube or paint is used as a coating material.

PRIOR ART LITERATURE

Patent Literature

Patent Literature 1: JP 2015-078789 A

SUMMARY

In the conventional art of Patent Literature 1, because the method of applying the paint to the brazed part as a coating material requires a step of removing a flux residue after brazing in advance, the number of steps may be greatly increased in some cases.

Further, the method of using the heat shrinkable tube as the coating material cannot be used for coating the connection pipe after brazing in case of using a U bent shaped connection pipe as the connection pipe, and the application of that method is limited.

In view of the above points, an object of the present disclosure is to provide a heat exchanger having a high brazing quality between a heat transfer tube and a connection pipe, and a method for producing the heat exchanger.

According to one aspect of the present disclosure, a heat exchanger includes: a plurality of heat transfer tubes through which a heat medium flows, the plurality of heat transfer tubes being made of aluminum and arrayed side by side; a plurality of connection pipes through which the heat medium flows, the plurality of connection pipes being made of aluminum and brazed to end portions of the plurality of heat transfer tubes; and a heat equalizing device formed of a heat conductor and disposed to be in contact at least partly with at least two of the plurality of connection pipes and be capable of transferring heat therebetween.

According to the above configuration, when the heat transfer tubes and the connection pipes are brazed by heating in a process of manufacturing the heat exchanger, since the respective connection pipes transfer a heat to each other through the heat equalizing device, a temperature rising can be prevented from being varied between the respective connection pipes.

For that reason, since the variation in the heat conduction from each connection pipe to a joint can be reduced, brazing between the heat transfer tube and the connection pipe can be thermally equalized. Therefore, the heat exchanger having a high brazing quality between the heat transfer tubes and the connection pipes can be provided.

According to another aspect of the present disclosure, a heat exchanger is produced by a method, and the heat exchanger includes: a plurality of heat transfer tubes through which a heat medium flows, the plurality of heat transfer tubes being made of aluminum and arrayed side by side; and a plurality of connection pipes through which the heat medium flows, the plurality of connection pipes being made of aluminum and joined to end portions of the plurality of heat transfer tubes. The method for producing the heat exchanger includes brazing the plurality of heat transfer tubes to the plurality of connection tubes in a state where a heat equalizing device formed of a heat conductor is disposed to be in contact at least partly with at least two of the plurality of connection pipes and be capable of transferring heat therebetween.

According to this method, the same operational effects as those in the invention described in the first aspect can be obtained.

DESCRIPTION OF EMBODIMENTS

Figure 1:
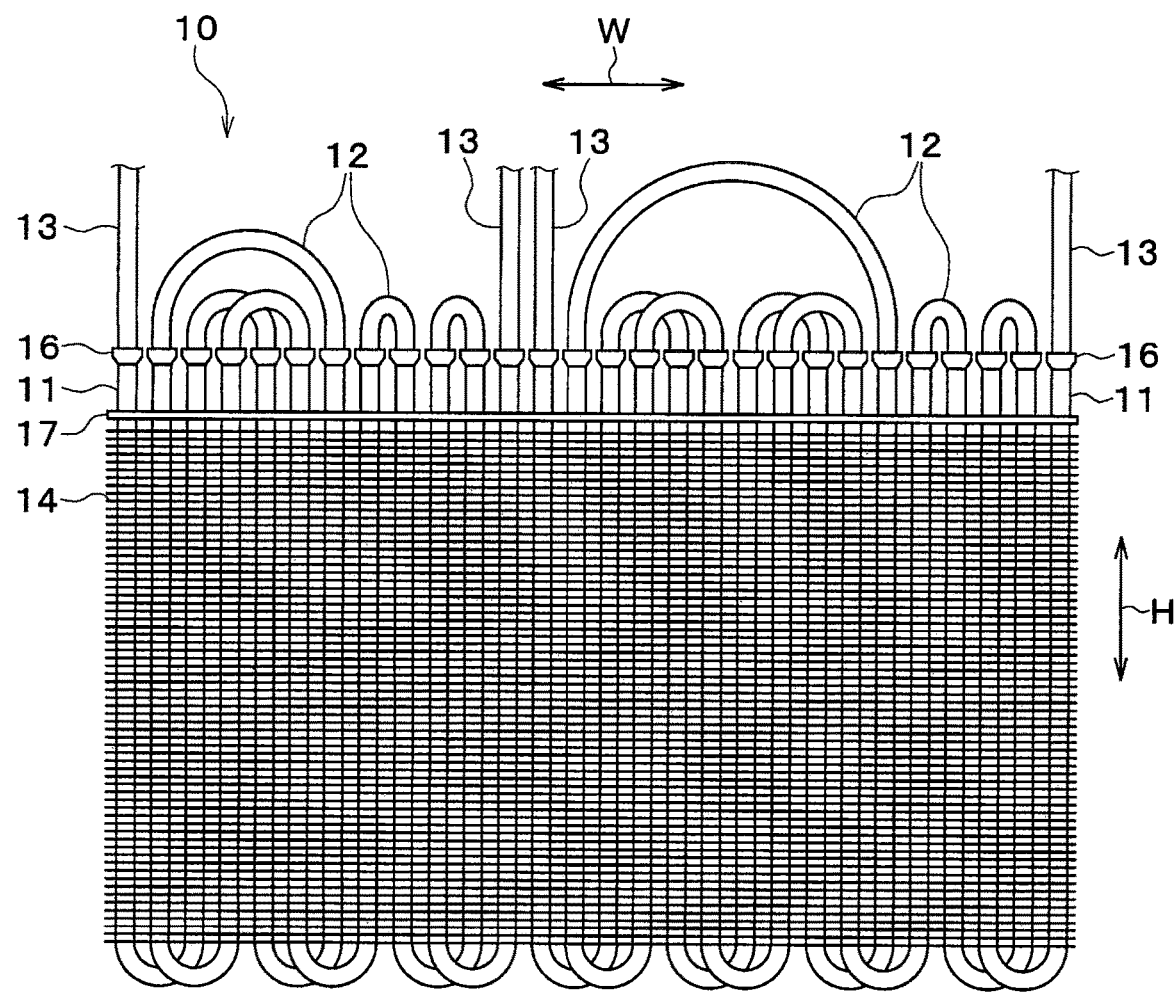
FIG. 1 is a front view of a heat exchanger according to a first embodiment of the present disclosure.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

First, a heat exchanger 10 manufactured by brazing will be described with reference to FIGS. 1 to 4. The heat exchanger 10 is a refrigeration cycle heat exchanger for exchanging a heat between a refrigerant in a refrigeration cycle and an air.

In the figures, an arrow W indicates a width direction of the heat exchanger 10. In the figures, an arrow D indicates a depth direction of the heat exchanger 10. In the figures, an arrow H indicates a height direction of the heat exchanger 10.

The heat exchanger 10 includes a large number of heat transfer tubes 11, a large number of connection pipes 12, 13, a large number of fins 14, and side plates 17. The heat exchanger 10 is a cross fin tube heat exchanger in which the large number of tubular heat transfer tubes 11 are inserted into the large number of plate-shaped fins 14.

Each of the heat transfer tubes 11 is a heat exchanging member that exchanges a heat between a refrigerant flowing inside the heat transfer tube 11 and an air flowing outside the heat transfer tube 11. The heat transfer tube 11 linearly extends in the height direction H of the heat exchanger 10. The large number of heat transfer tubes 11 are aligned side by side in the width direction W of the heat exchanger 10. In other words, an alignment direction of the heat transfer tubes 11 coincides with the width direction W of the heat exchanger 10.

The heat transfer tubes 11 are also aligned in multiple rows in the depth direction D of the heat exchanger 10. The air flowing outside the heat transfer tubes 11 flows in the depth direction D of the heat exchanger 10.

A large number of connection pipes 12 and 13 are roughly classified into tube connection pipes 12 and tank connection pipes 13. The tube connection pipes 12 each have a shape bent in the form of a hairpin and connect one end portions of the two heat transfer tubes 11 to each other.

Figure 2:
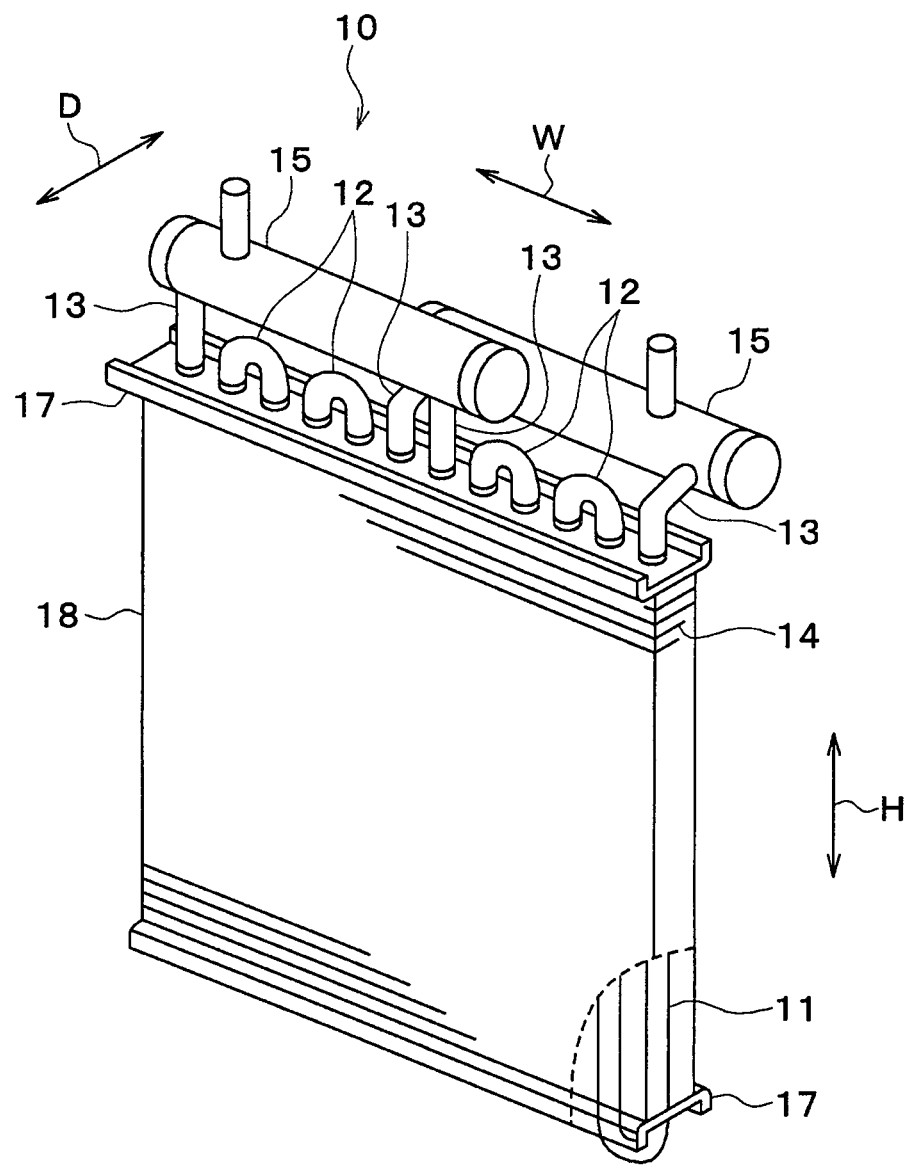
FIG. 2 is a perspective view of a heat exchanger according to the first embodiment.

The tank connection pipes 13 each have a shape extending substantially linearly, and as shown in FIG. 2, connect one end portion of the corresponding heat transfer tube 11 to a refrigerant tank 15. The refrigerant tank 15 is a distribution tank that distributes the refrigerant to the multiple heat transfer tubes 11, or a collective tank into which the refrigerant from the multiple heat transfer tubes 11 is collected.

Most of the fins 14 are heat transfer promoting members that increase a heat transfer area between the heat transfer tubes 11 and the air to promote a heat exchange between the air and the refrigerant. The fins 14 are plate fins formed in a plate shape. The heat transfer tubes 11 and the fins 14 configure a core portion 18 for performing a heat exchange between the refrigerant and the air.

The most of fins 14 are stacked on each other in the height direction H of the heat exchanger 10 (in other words, the longitudinal direction of the heat transfer tubes 11). The most of heat transfer tubes 11 penetrate through the large number of fins 14 in a skewered manner. The heat transfer tubes 11 are mechanically expanded and come in close contact with the fins 14.

The heat transfer tubes 11 and the fins 14 configure the core portion 18 of the heat exchanger 10. The side plate 17 is a reinforcing member that reinforces the core portion 18.

The heat transfer tubes 11, the connection pipes 12, 13, the fins 14 and the side plates 17 are each made of an aluminum alloy. With the expansion of the heat transfer tubes 11, the heat transfer tubes 11, the fins 14 and the side plates 17 are tightly joined to each other. The brazing material is heated and melted so that the heat transfer tubes 11 and the connection pipes 12, 13 are brazed to each other.

Figure 3:
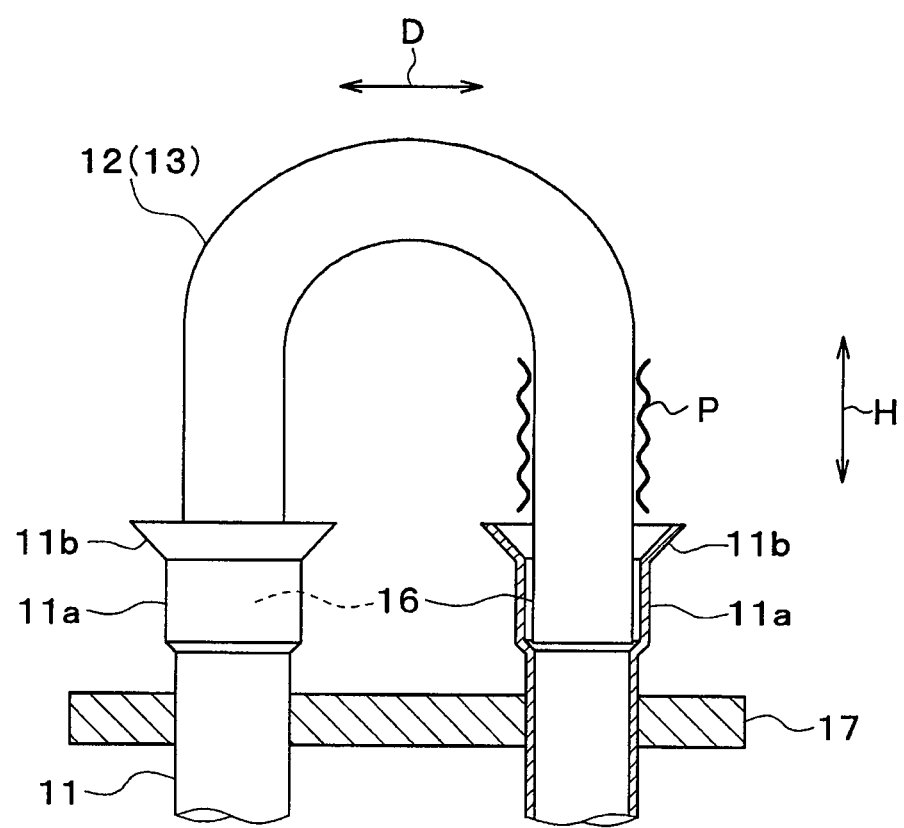
FIG. 3 is a partial cross-sectional view of a heat transfer tube and a connection pipe according to the first embodiment.

As shown in FIG. 3, an enlarged opening portion 11a and a flared portion 11b are formed at an end portion of each heat transfer tube 11. The enlarged opening portion 11a is formed by enlarging a diameter of an end opening portion of the heat transfer tube 11. The flared portion 11b is formed by further flaring the enlarged opening portion 11a. A tip of the connection pipes 12 and 13 is inserted into the enlarged opening portion 11a of the heat transfer tube 11. Fitting gaps between the heat transfer tube 11 and the connection pipes 12, 13 are brazed to each other, to thereby provide a refrigerant flow channel.

A large number of joints 16 between the heat transfer tubes 11 and the connection pipes 12, 13 are aligned in the width direction W of the heat exchanger 10. The joints 16 are also aligned in multiple rows in the depth direction D of the heat exchanger 10. The positions of those joints 16 in the height direction H of the heat exchanger 10 are identical with each other.

Figure 4:
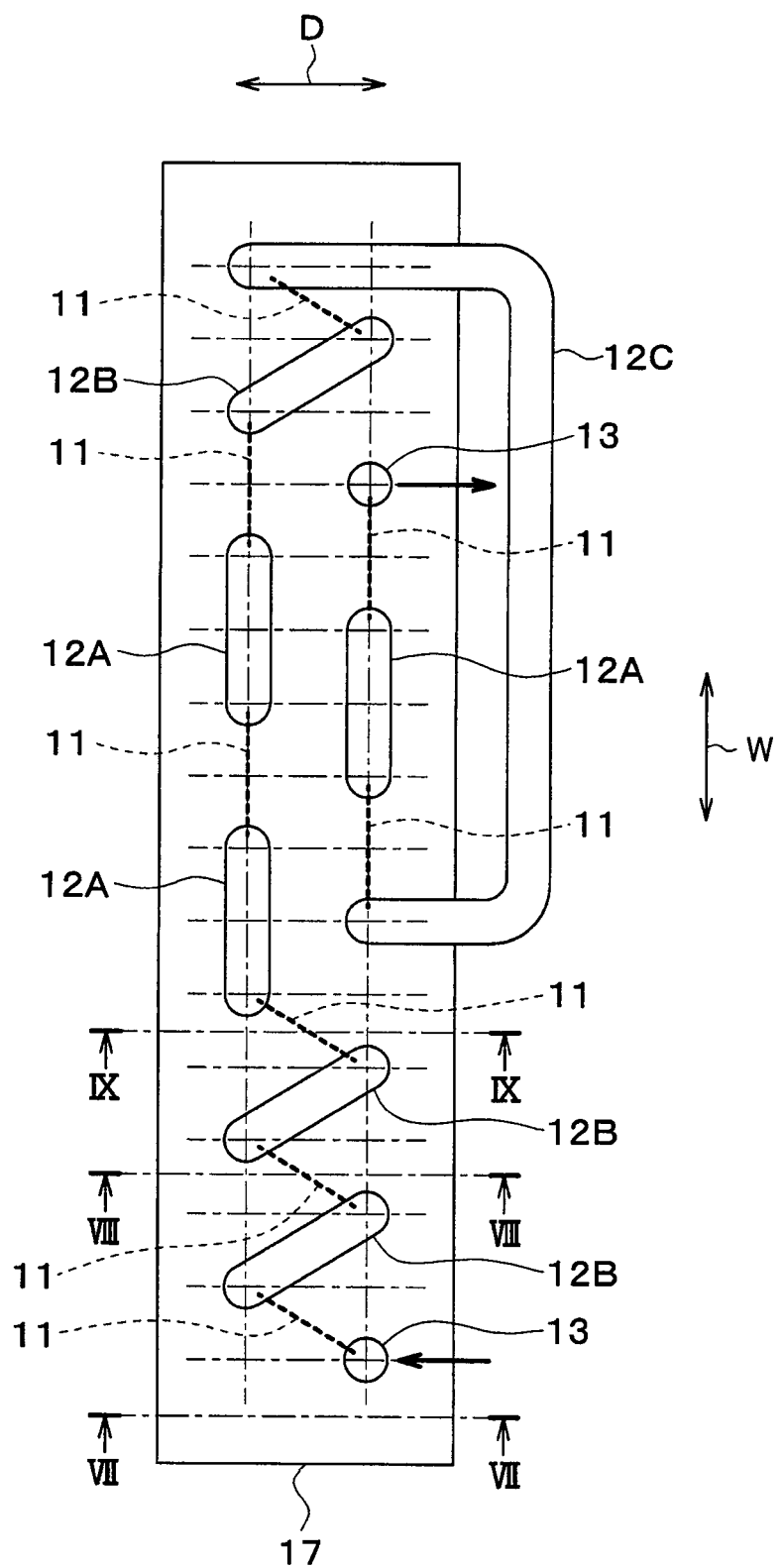
FIG. 4 is a schematic top view of a heat exchanger according to the first embodiment.

As shown in FIG. 4, the tube connection pipe 12 has a mixture of short connection pipes 12A that are disposed in parallel to the width direction W of the heat exchanger 10, short connection pipes 12B that are disposed obliquely to the width direction W of the heat exchanger 10, and long connection pipes 12C. The tank connection pipe 13 is an inlet and outlet pipe for refrigerant.

Next, a method for producing the heat exchanger 10 will be described. First, through holes not shown through which the heat transfer tubes 11 are inserted are provided in each of the fins 14 and the side plates 17. After the respective fins 14 are arranged at equal intervals, the heat transfer tubes 11 are inserted through the through holes.

Figure 5:
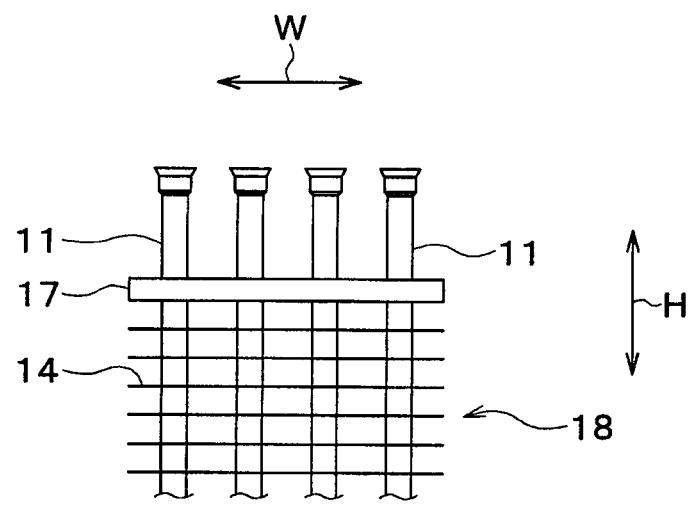
FIG. 5 is a front view of a part of the core portion according to the first embodiment.

Thereafter, a tube enlarging process of enlarging the heat transfer tubes 11 is performed. Specifically, a tube expander not shown having a larger diameter than an inner diameter of the heat transfer tube 11 is inserted into the heat transfer tube 11, and the heat transfer tube 11 is mechanically expanded by the tube expander. With the expansion of the heat transfer tubes 11, the fins 14 and the side plates 17 are brought into close contact with the heat transfer tubes 11 for joining. Thereafter, the enlarged opening portion 11a and the flared portion 11b are formed at each end portion of the heat transfer tubes 11. As a result, as shown in FIG. 5, the core portion 18 of the heat exchanger 10 is produced.

Figure 6:
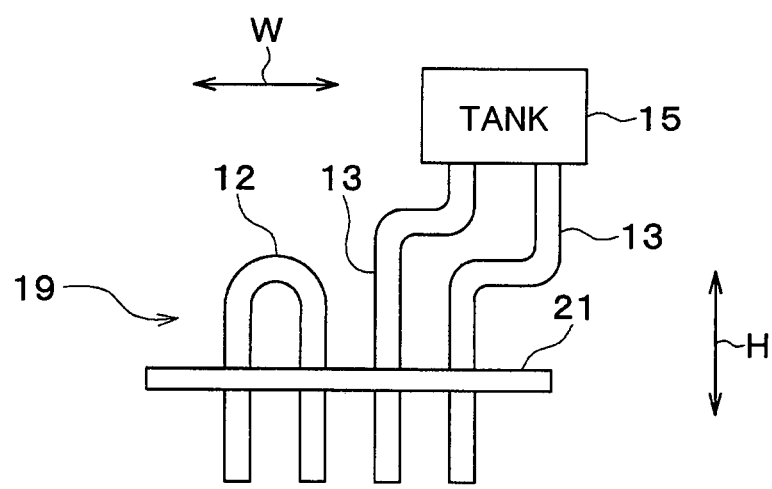
FIG. 6 is a front view of a part of a connection pipe assembly according to the first embodiment.

Further, an assembling process of joining the heat equalizing member 21 to the connection pipes 12 and 13 is performed. For example, the connection pipes 12, 13 and the heat equalizing member 21 are brazed to each other with an Al—Si brazing material. The connection pipes 12, 13 and the heat equalizing member 21 may be fixed to each other by welding, caulking or the like. As a result, as shown in FIG. 6, the connection pipe assembly 19 having the connection pipes 12, 13 and the heat equalizing member 21 is produced.

Noncorrosive flux containing a cesium fluoride system and a brazing material near an Al—Cu—Si ternary element eutectic composition, or a brazing material of an Al—Cu—Si—Zn system in which Zn is added to the above component are appropriately coated on a region P indicated by wavy lines in the connection pipes 12 and 13 in FIG. 3, in other words, in a region close to a joint target portion 16 to be joined to the connection pipes 12 and 13.

The Al—Cu—Si brazing material has been adjusted to have a solidus temperature of 510° C. and a liquidus temperature of about 540° C., which is remarkably lower than the Al—Si based solidus temperature of 577° C. In order to braze in the above temperature range, the flux has activity from a low temperature of 420° C.

The heat equalizing member 21 is a heat equalizing device for equalizing the brazing between the heat transfer tubes 11 and the connection pipes 12, 13. The heat equalizing member 21 is made of, for example, aluminum.

Figure 7:
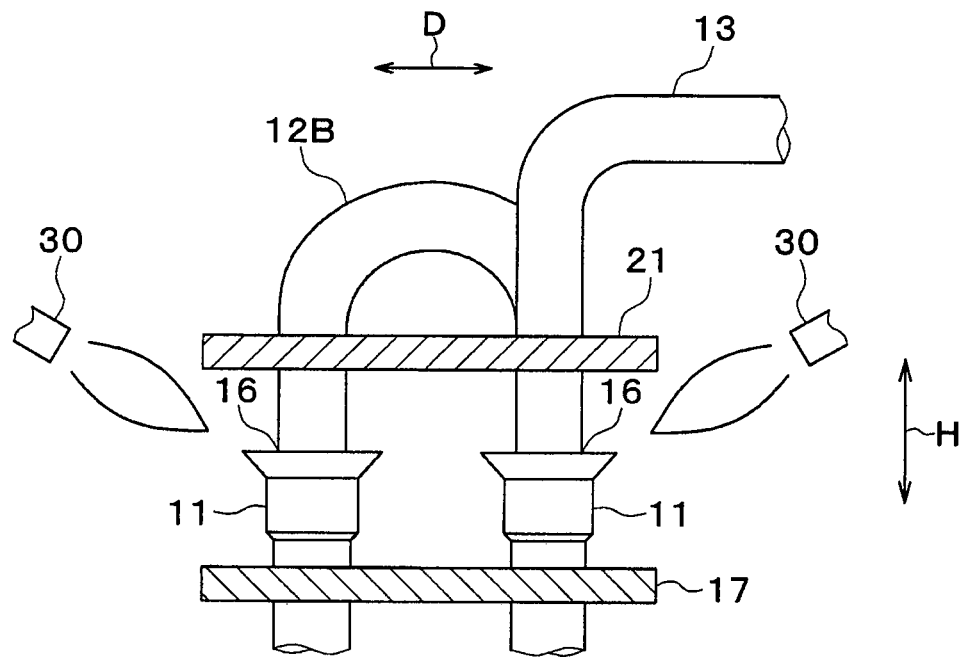
FIG. 7 is a cross-sectional view taken along a line VII-VII of FIG. 4.
Figure 8:
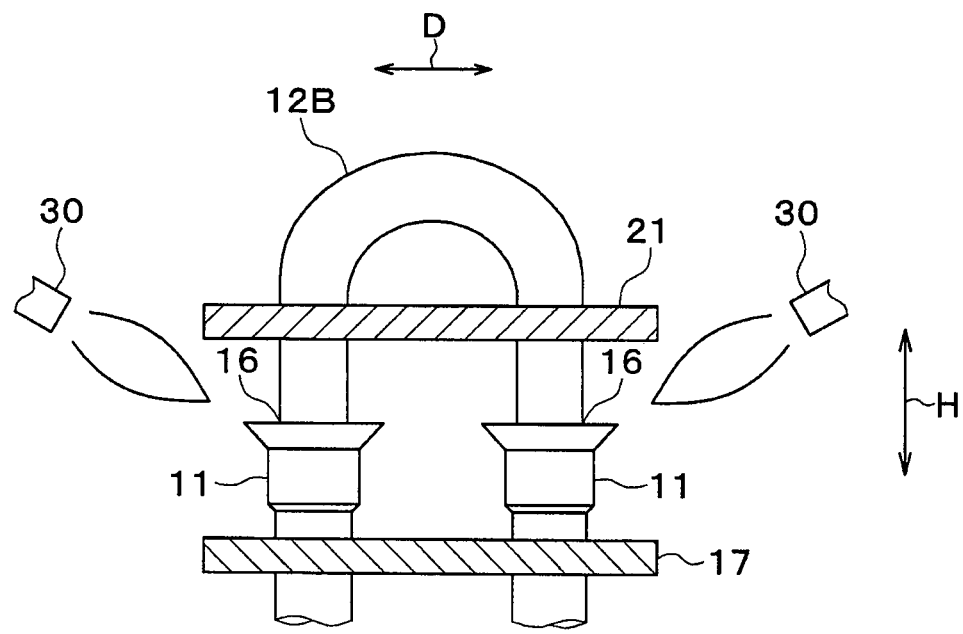
FIG. 8 is a cross-sectional view taken along a line VIII-VIII in FIG. 4.
Figure 9:
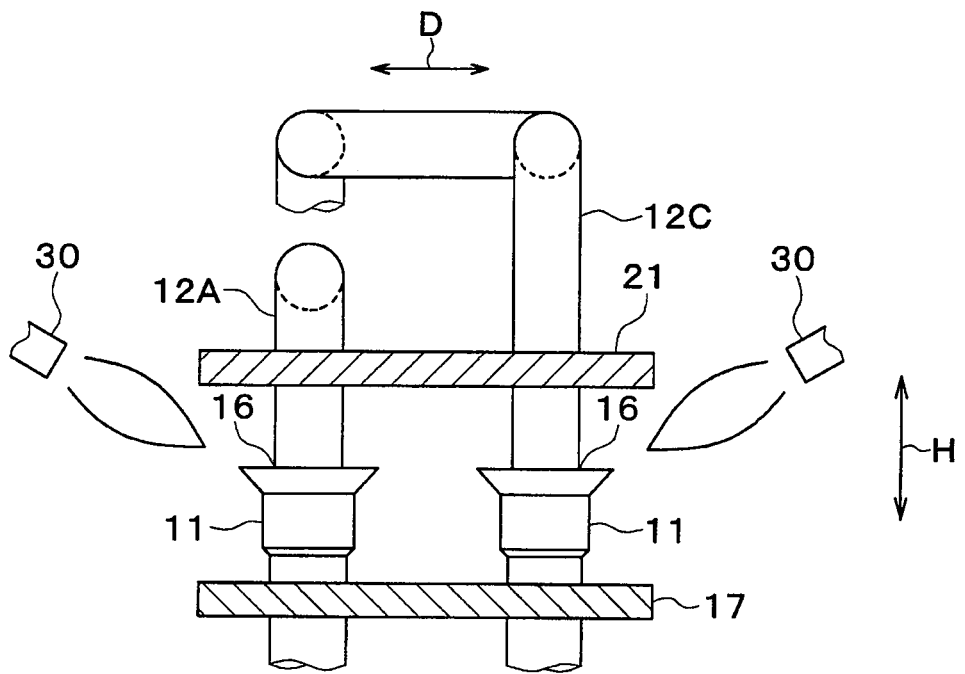
FIG. 9 is a cross-sectional view taken along a line IX-IX in FIG. 4.

After the tube enlarging process and the assembling process, a heating joining process is performed. In the heating joining process, the connection pipes 12 and 13 of the connection pipe assembly 19 are joined to the heat transfer tubes 11 of the core portion 18 by heating. Specifically, as shown in FIGS. 7, 8, and 9, after the connection pipes 12 and 13 have been temporarily joined to the heat transfer tubes 11, the joint target portion 16 between the heat transfer tube 11 and the connection pipes 12, 13 is locally heated by the line burner 30. The line burner 30 heats the joint target portion 16 from the outside of the heat exchanger 10 in the depth direction D.

As a result, the joint target portion 16 between the heat transfer tube 11 and the connection pipes 12, 13 is locally heated to about 550° C. Therefore, the brazing material is coated on the region P indicated by the wavy lines in FIG. 3 in the connection pipes 12 and 13, in other words, the region in the vicinity of the joint target portion 16. The brazing material is melted and flows into the fitting gap between the heat transfer tube 11 and the connection pipes 12, 13 through the flared portion 11b of the heat transfer tube 11. As a result, the heat transfer tube 11 and the connection pipes 12, 13 are brazed to each other.

In the present embodiment, since the shapes of the connection pipes 12 and 13 are different from each other, heat capacities of the connection pipes 12 and 13 are also different from each other. For that reason, when the heat equalizing member 21 is not provided, a temperature of each brazed part (in other words, the fitting portion of the heat transfer tube 11 and the connection pipes 12, 13) becomes non-uniform and a brazing flow shortage and the melting of the base metal occur.

In view of the above, in the present embodiment, since the heat equalizing member 21 is provided, even if the shape and heat capacity of the connection pipes 12 and 13 are different from each other, a temperature variation of the brazed part can be remarkably reduced by the heat transfer effects of the heat equalizing member 21. Therefore, a large number of brazed parts can be brazed by the line burner 30 without causing the melting of the base metal and insufficient melting of the brazing material to occur.

In other words, since the respective connection pipes 12 and 13 transfer the heat to each other through the heat equalizing member 21, a variation in temperature rising between the connection pipes 12 and 13 is reduced. For that reason, since the brazing between the heat transfer tube 11 and the connection pipes 12, 13 is thermally equalized, the brazing quality is improved.

In addition, a low melting point brazing material in the vicinity of the Al—Cu—Si ternary element eutectic composition, or a low melting point brazing material of Al—Cu—Si—Zn system in which Zn is added to the above component is used for brazing the connection pipes 12, 13 and the heat transfer tube 11. Therefore, a difference in melting point between the aluminum base metal and the brazing material is expanded, and brazing is facilitated.

With the appropriate selection of the composition of the brazing material, a natural potential difference of the brazing material from the aluminum base metal can be reduced. As a result, the brazing material can be prevented from preferentially corroding.

Furthermore, the heat equalizing member 21 and the connection pipes 12, 13 are joined together with an Al—Si brazing material of a high melting point. Therefore, when the connection pipes 12, 13 and the heat transfer tube 11 are brazed with the low melting point brazing material, secondary dissolution can be prevented.

Figure 10:
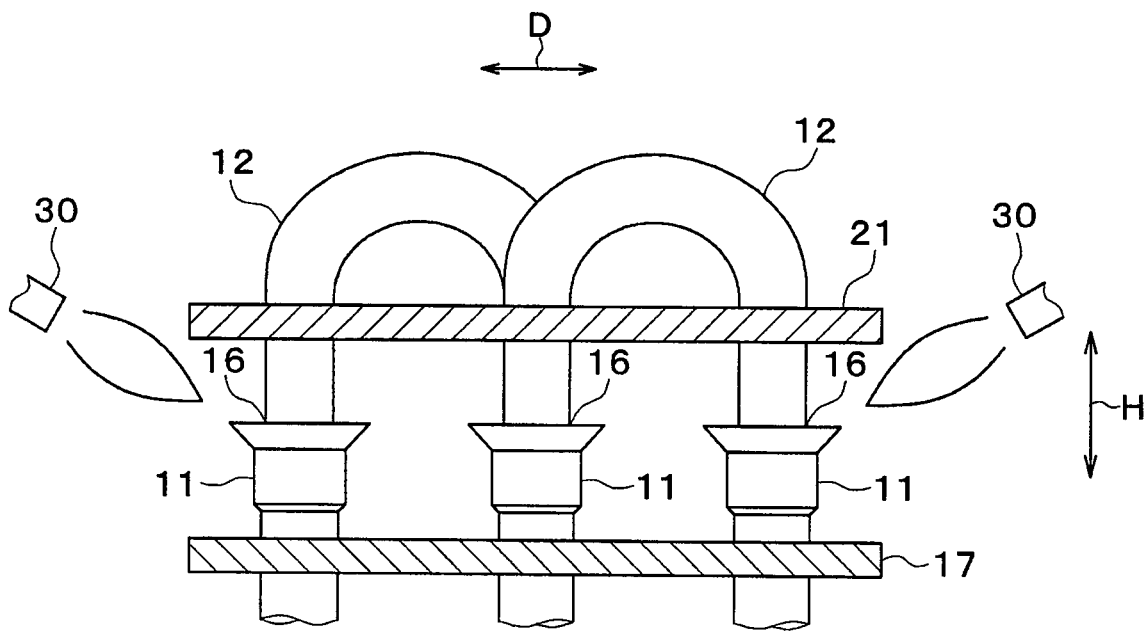
FIG. 10 is a cross-sectional view of a part of a heat exchanger in a modification of the first embodiment.

In a modification shown in FIG. 10, three or more rows of the heat transfer tubes 11 are also arrayed in the depth direction D of the heat exchanger 10. In the modification, influence of the flame on the heat transfer tube 11 in the center row in the depth direction D of the heat exchanger 10 is lower than that on the heat transfer tubes 11 in both side rows. However, owing to the effect of heat transfer by the heat equalizing member 21 and the effect of an increase in the brazing temperature range by employing the Al—Cu—Si ternary element brazing material, all of three or more rows are easily brazed by the line burner at the same time.

In the present embodiment, the three element system of Al—Cu—Si is used for brazing the connection pipes 12, 13 and the heat transfer tube 11. However, when a difference in shape between the connection pipes 12 and 13 is small, an Al—Si brazing material may be used.

In the present embodiment, the heat equalizing member 21 is formed of a heat conductor, and is disposed so as to come in heat transferable contact with at least a part of at least two connection pipes 12 and 13 among the multiple connection pipes 12 and 13.

According to the above configuration, when the heat transfer tubes 11 and the connection pipes 12, 13 are brazed by heating in a process of manufacturing the heat exchanger, since the respective connection pipes 12 and 13 transfer a heat to each other through the heat equalizing member 21, a temperature rising can be prevented from being varied between the respective connection pipes 12 and 13.

For that reason, since the variation in the heat transfer from each of the connection pipes 12 and 13 to the joint 16 can be reduced, brazing between the heat transfer tube 11 and the connection pipes 12, 13 can be thermally equalized. Therefore, the heat exchanger having the high brazing quality between the heat transfer tubes 11 and the connection pipes 12, 13 can be provided.

Even in the heat exchanger in which three or more rows of heat transfer tubes 11 are arrayed as shown in FIG. 10, brazing between the heat transfer tube 11 and the connection pipes 12, 13 is thermally equalized, thereby being capable of obtaining the high brazing quality.

In the present embodiment, the heat equalizing member 21 and the multiple connection pipes 12, 13 are brazed to each other. The brazing material that joins the multiple heat transfer tubes 11 and the multiple connection tubes 12, 13 has a lower melting point than that of the brazing material that joins the heat equalizing member 21 and the multiple connection pipes 12, 13.

This makes it possible to prevent the brazing material that connects the heat transfer tube 11 and the multiple connection pipes 12, 13 from being secondarily dissolved when brazing the connection pipes 12, 13 and the heat transfer tube 11.

In the present embodiment, the brazing material that joins the multiple heat transfer tubes 11 to the multiple connection pipes 12, 13 may contain one of an Al—Cu—Si brazing material and an Al—Cu—Si—Zn brazing material. The brazing material that joins the multiple heat transfer tubes 11 to the multiple connection pipes 12, 13 may be one of an Al—Cu—Si brazing material and an Al—Cu—Si—Zn brazing material. According to the above configuration, since the melting point of the brazing material joining the multiple heat transfer tubes 11 and the multiple connection tubes 12, 13 is low, the melting point difference in the brazing material between the aluminum heat transfer tube 11 and the connection pipes 12, 13 is enlarged. For that reason, the brazing between the heat transfer tube 11 and the connection pipes 12, 13 is facilitated.

In the present embodiment, the heat equalizing member 21 and the multiple connection pipes 12, 13 come in mechanical contact with each other. As a result, when the connection pipes 12, 13 and the heat transfer tube 11 are brazed with the low melting point brazing material, the heat equalizing member 21 and the multiple connection pipes 12, 13 can be surely brought into contact with each other to reliably perform heat conduction.

In the present embodiment, the multiple heat transfer tubes 11 and the multiple connection pipes 12, 13 are brazed to each other in a state in which the heat equalizing member 21 formed of the heat conductor is disposed so as to come in heat transferable contact at least partly with at least two pipes 12 and 13 of the multiple connection pipes 12 and 13.

According to the above configuration, when the heat transfer tubes 11 and the connection pipes 12, 13 are brazed by heating in a process of manufacturing the heat exchanger, since the respective connection pipes 12 and 13 transfer a heat to each other through the heat equalizing member 21, a temperature rising can be prevented from being varied between the respective connection pipes 12 and 13.

For that reason, since the variation in the heat transfer from each of the connection pipes 12 and 13 to the joint 16 can be reduced, brazing between the heat transfer tube 11 and the connection pipes 12, 13 can be thermally equalized. Therefore, the heat exchanger having the high brazing quality between the heat transfer tubes and the connection pipes can be provided.

In the present embodiment, the core portion 18 is produced by joining the fin 14 and the multiple heat transfer tubes 11 together, the connection pipe assembly 19 is manufactured by joining the heat equalizing member 21 and the multiple connection pipes 12, 13, and the heat transfer tubes 11 and the multiple connection pipes 12, 13 are brazed by joining the core portion 18 and the connection pipe assembly 19.

As a result, when the multiple heat transfer tubes 11 and the multiple connection pipes 12, 13 are brazed together, the heat equalizing member 21 can reliably be brought into heat transferable contact with the multiple connection pipes 12 and 13.

Second Embodiment

In the above embodiment, the connection pipes 12 and 13 are joined to the heat transfer tube 11 by the burner heating, but in the present embodiment, connection pipes 12 and 13 are joined to the heat transfer tube 11 by high frequency induction heating.

Specifically, similarly to the embodiment described above, a tube enlarging process is performed to form a core portion 18 of a heat exchanger 10, and an assembling process is performed to form the connection pipe assembly 19, and thereafter a high frequency induction heating process is performed.

In the high frequency induction heating process, a joint target portion 16 between the heat transfer tube 11 and the connection pipes 12, 13 is locally heated by high frequency induction heating. As a result, the heat transfer tube 11 and the connection pipes 12, 13 are brazed together.

Figure 11:
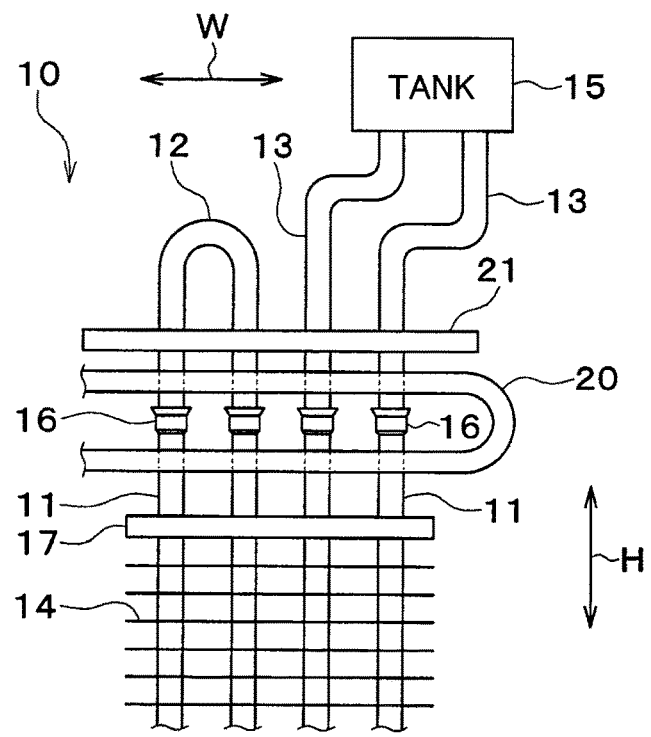
FIG. 11 is a partially enlarged front view of a heat exchanger in a high frequency induction heating process according to a second embodiment of the present disclosure.
Figure 12:
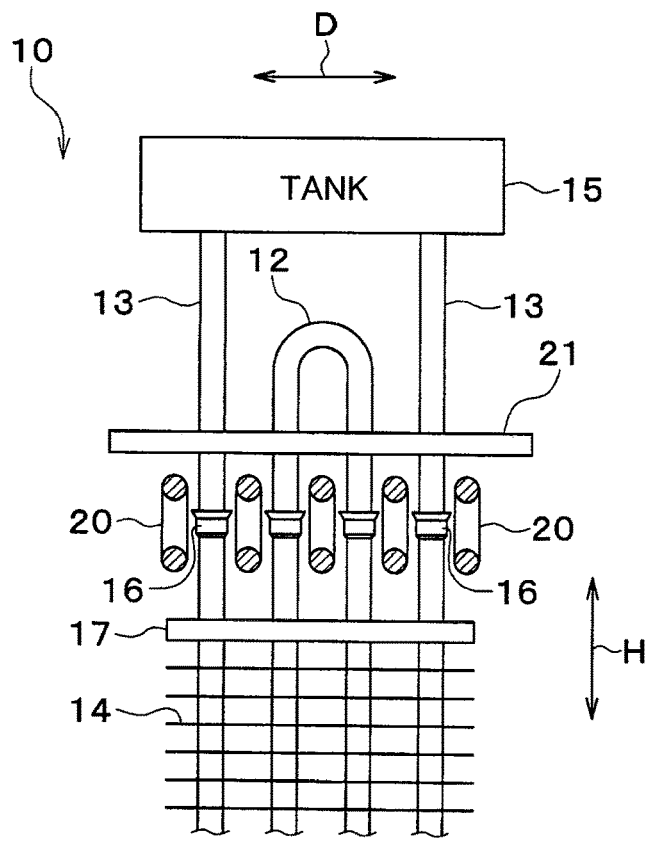
FIG. 12 is a partially enlarged side view of the heat exchanger in the high frequency induction heating process according to the second embodiment.

Details of the high frequency induction heating process will be described. First, as shown in FIGS. 11 and 12, a coil 20 for high frequency induction heating is disposed on a side of the joint target portion 16 and a heat equalizing member 21 is disposed above the coil 20.

Figure 13:
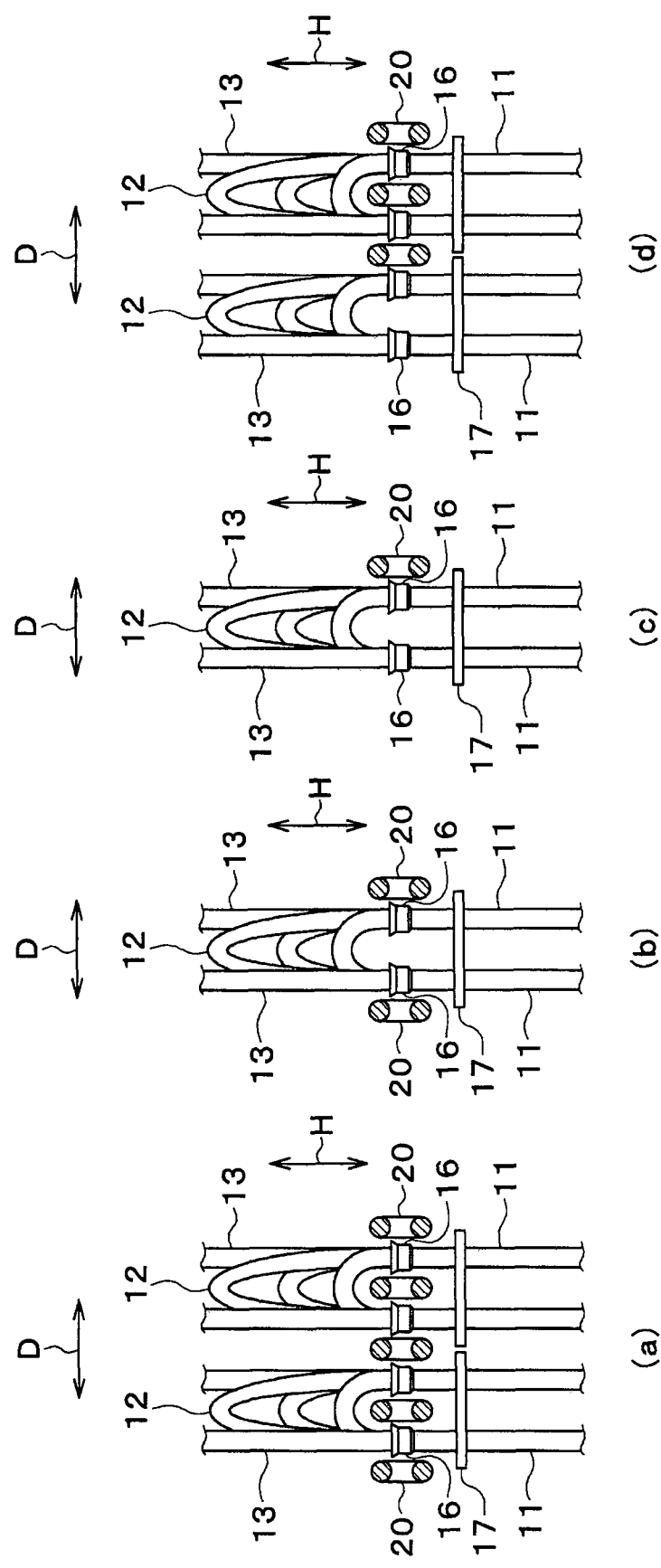
FIG. 13 is a diagram illustrating placement examples of a coil in the high frequency induction heating process according to the second embodiment.

An example of how the coil 20 is placed is shown in FIG. 13. In an example of FIG. 13(a), the coil 20 is inserted into both sides of each heat transfer tube 11 and between the heat transfer tubes 11 in a width direction W of the heat exchanger 10 (in a direction perpendicular to a paper surface of FIG. 13(a)).

As in the example of FIGS. 13(b) to 13(d), there may be a place where the coil 20 is not inserted in the example of FIG. 13(a).

The heat equalizing member 21 is a heat equalizing device for equalizing the brazing between the heat transfer tubes 11 and the connection pipes 12, 13. The heat equalizing member 21 is a magnetic body that reduces the passage of a magnetic flux. The heat equalizing member 21 is a heat conduction member formed of a heat conductor. The heat equalizing member 21 is made of, for example, aluminum.

The heat equalizing member 21 is temporarily fixed between a portion of the connection pipes 12 and 13 furthest away from the joint target portion 16 and the coil 20 by brazing, welding or a jig. The heat equalizing member 21 may be provisionally fixed in advance before the high frequency induction heating process.

The heat equalizing member 21 is a plate-shaped member extending in the width direction W of the heat exchanger 10. In the heat equalizing member 21, a hole 21a through which the connection pipes 12 and 13 pass is provided. A peripheral portion of the hole 21a in the heat equalizing member 21 comes in contact with an outer peripheral surfaces of the connection pipes 12 and 13.

A current flows in the coil 20 in a state where the coil 20 and the heat equalizing member 21 are disposed at the above positions. With a magnetic flux generated resultantly, the joint target portion 16 is subjected to high frequency induction heating and the brazing material is melted.

At this time, a variation in temperature rising caused by the magnetic flux by the heat equalizing member 21 can be reduced. The reason will be described below.

In the high frequency induction heating, a portion having a high magnetic flux density is greatly heated. For that reason, when the heat equalizing member 21 is not used, the whole temperature is determined according to the magnetic flux density and the heat capacity. The magnetic flux density is determined according to a distance between the position of the coil 20 and the pipe touched by the magnetic flux.

When the connection pipes 12 and 13 are different from each other in shape such as a U-bent height difference or an L-shaped bending portion difference, or the installation directions of the connection pipes 12 and 13 are different from each other, the distances between the connection pipes 12, 13 and the coil 20 are different from each other, even if the heat capacities of the connection pipes 12 and 13 are identical with each other, temperature variation occurs between the connection pipes 12 and 13, and the temperature variation between the brazed parts becomes large.

In view of the above, in the present embodiment, the magnetic flux is prevented from passing by the shield effect of the heat equalizing member 21 which is a magnetic body. For that reason, even if the shapes of the portions of the connection pipes 12 and 13 that are farther from the coil 20 than the heat equalizing member 21 are different from each other, the shape of the portion of the connection pipes 12 and 13 closer to the coil 20 than the heat equalizing member 21 and the position of the connection pipes 12 and 13 from the coil 20 are uniform, variations in the temperature rising caused by the magnetic flux can be reduced.

Further, since the respective connection pipes 12 and 13 transfer the heat to each other through the heat equalizing member 21, a variation in temperature rising between the connection pipes 12 and 13 is further reduced. For that reason, since the brazing between the heat transfer tube 11 and the connection pipes 12, 13 is further thermally equalized, the brazing quality is further improved.

Figure 14:
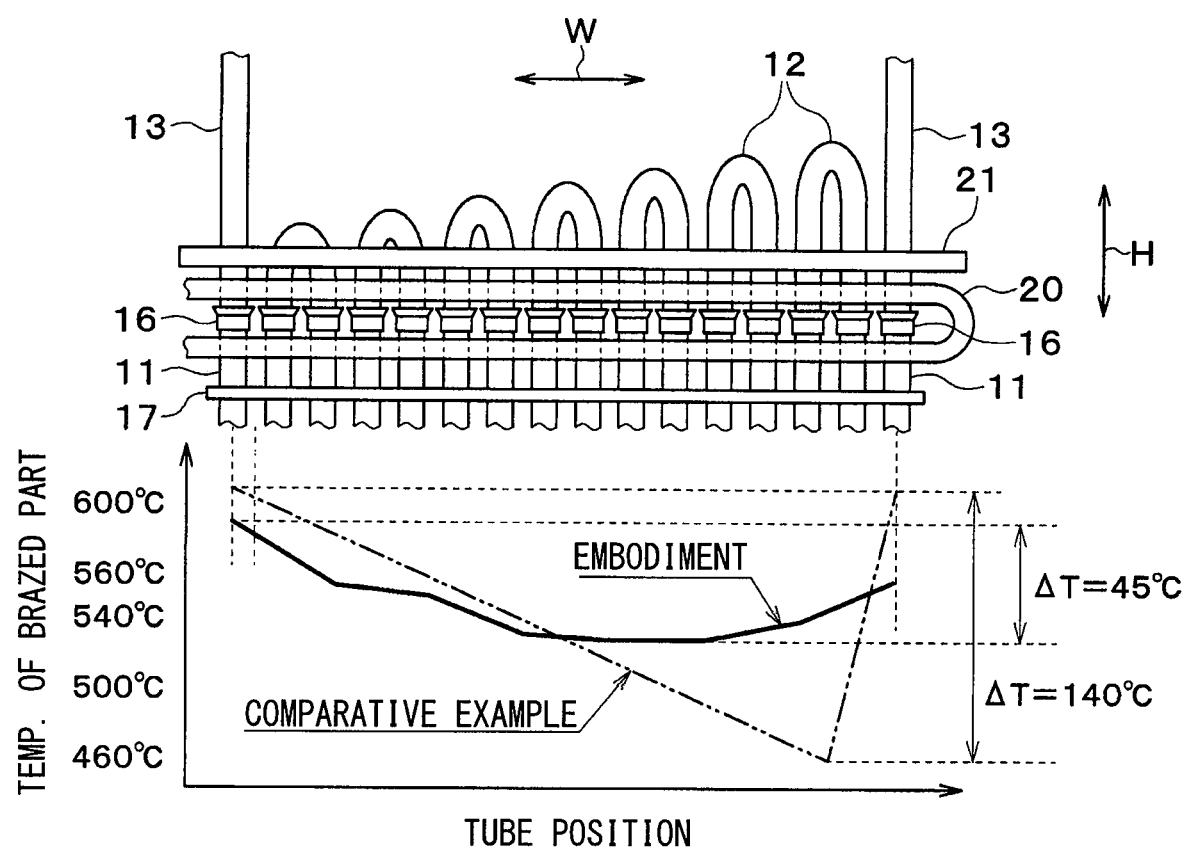
FIG. 14 is a graph illustrating a brazed part temperature in the high frequency induction heating process according to the second embodiment.

As shown by a two-dot chain line in FIG. 14, in a comparative example without using the heat equalizing member 21, the temperature variation in each of the joint target portions 16 is about 140° C. On the other hand, as shown by a solid line in FIG. 14, in the present embodiment using the heat equalizing member 21, a variation in temperature of the joint target portions 16 is about 45° C., and the temperature variation is reduced by about 100° C. as compared with the comparative example.

In the present embodiment, the heat equalizing member 21 is brazed to the connection pipes 12 and 13 by high frequency induction heating. In other words, in the present embodiment, the heat equalizing member 21 is a component of the heat exchanger 10.

The heat equalizing member 21 may be detached from the connection pipes 12 and 13 after the high frequency induction heating. In other words, the heat equalizing member 21 may be a jig used in the manufacturing process of the heat exchanger 10.

In the present embodiment, in a state where the coil 20 is disposed on the side of the joint target portion 16 and the heat equalizing members 21 and 22 are disposed between the portion of the connection pipes 12 and 13 farthest from the joint target portion 16 and the coil 20, a current is caused to flow through the coil 20, whereby the heat transfer tube 11 and the connection pipes 12, 13 are brazed by high frequency induction heating at the joint target portion 16.

According to the above configuration, during the high frequency induction heating, the heat equalizing members 21 and 22 prevent the passage of the magnetic flux, thereby being capable of lowering the magnetic flux density of a portion of the connection pipes 12 and 13 that is farther from the coil 20 than the heat equalizing member 21 to reduce the temperature rising of the portion of the connection pipes 12 and 13. For that reason, even if the shapes of the connection pipes 12 and 13 are different from each other, variations in the temperature rising can be prevented from occurring between the connection pipes 12 and 13.

Therefore, since variations in heat conduction from the connection pipes 12 and 13 to the respective joint target portions 16 can be reduced, the brazing between the heat transfer tubes 11 and the connection pipes 12, 13 can be equalized. Further, the brazing quality between the heat pipe 11 and the connection pipes 12, 13 in the heat exchanger 10 can be enhanced.

In the present embodiment, the heat equalizing members 21 and 22 are brought into heat transferable contact with at least a part of the connection pipes 12 and 13.

As a result, since the respective connection pipes 12 and 13 transfer the heat to each other through the heat equalizing member 21, a variation in temperature rising between the connection pipes 12 and 13 can be further reduced. For that reason, since the brazing between the heat transfer tube 11 and the connection pipes 12, 13 can be further thermally equalized, the brazing quality between the heat transfer tube 11 and the connection pipes 12, 13 can be further enhanced.

In the present embodiment, as the heat equalizing members 21 and 22, members extending in the alignment direction W of the heat transfer tubes 11 are used. As a result, a large number of joint target portions 16 can be brazed by one high frequency induction heating.

Third Embodiment

Figure 15:
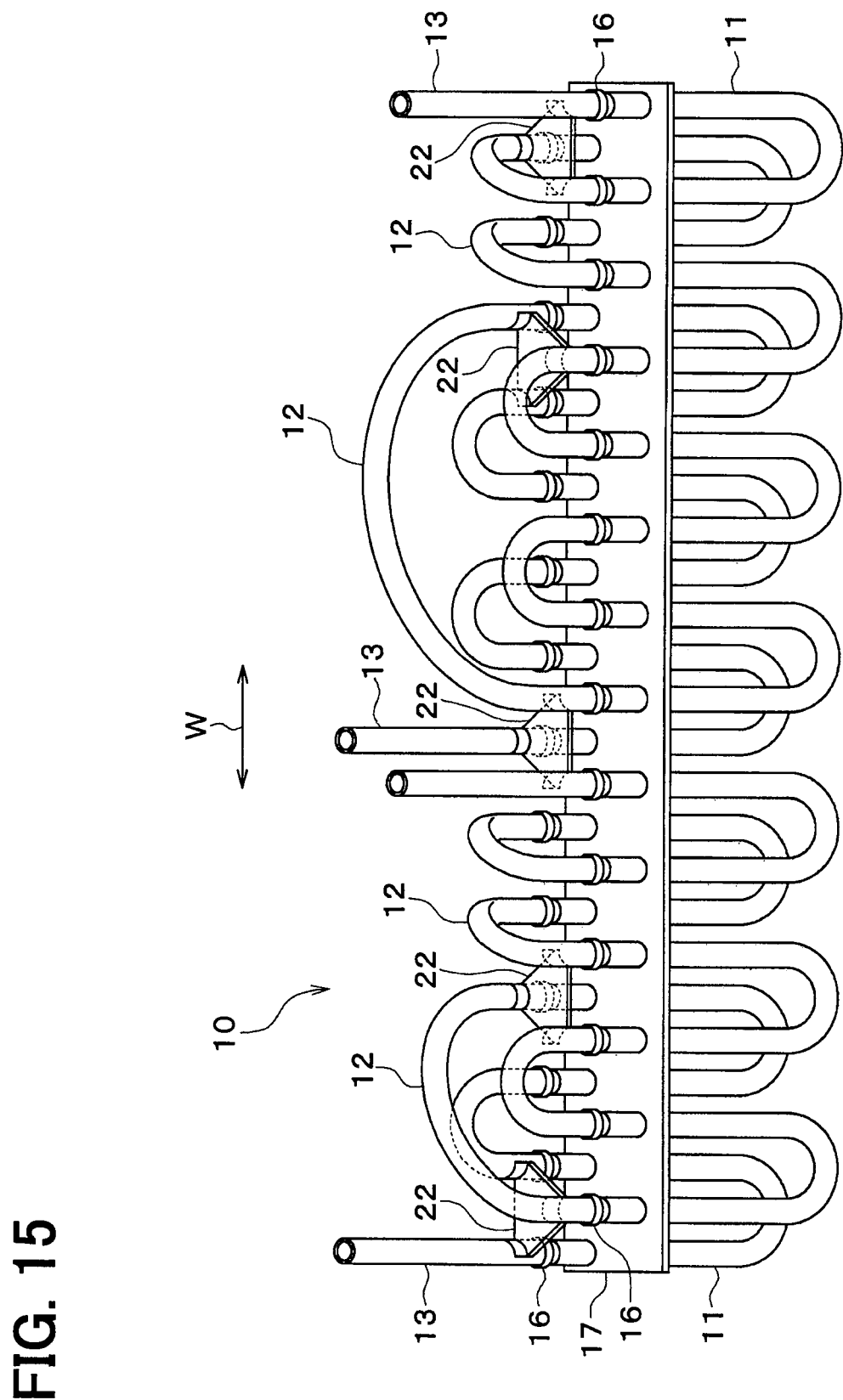
FIG. 15 is a partially perspective view of a heat exchanger according to a third embodiment of the present disclosure.
Figure 16:
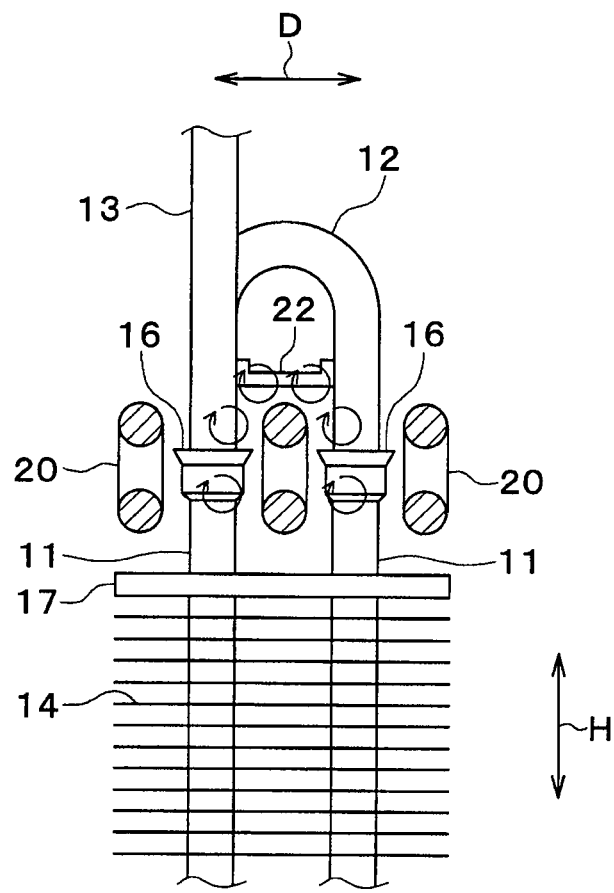
FIG. 16 is a partially enlarged side view of the heat exchanger in the high frequency induction heating process according to the third embodiment.

In the embodiments described above, the heat equalizing member 21 is a plate-shaped member extending in the alignment direction W of the heat transfer tubes 11, but in the present embodiment, as shown in FIGS. 15 and 16, each of heat equalizing members 22 is a block-shaped member that is fitted between thermal tubes 11.

The heat equalizing member 22 is a magnetic body that concentrates a magnetic flux and reduces the passage of the magnetic flux. The heat equalizing member 22 that is a magnetic flux passage reduction member is made of, for example, aluminum.

The heat equalizing member 22 is temporarily fixed between a portion of connection pipes 12 and 13 furthest away from a joint target portion 16 and a coil 20 by brazing, welding or a jig. The heat equalizing member 21 may be provisionally fixed in advance before the high frequency induction heating process. An edge of the heat equalizing member 22 comes in contact with outer peripheral surfaces of the connection pipes 12 and 13.

Even if the member fitted between the heat transfer tubes 11 is used as the heat equalizing member 22 as in the present embodiment, the same operational effects as those in the embodiments described above can be obtained.

Fourth Embodiment

Figure 17:
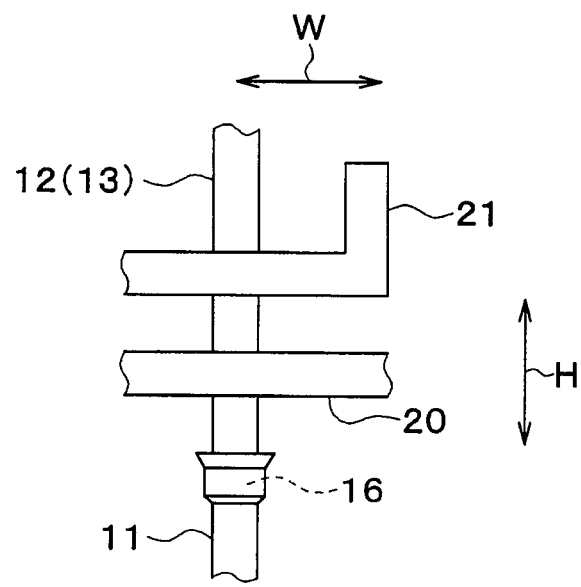
FIG. 17 is a partially enlarged front view of a heat exchanger according to a fourth embodiment of the present disclosure.

In the present embodiment, as shown in FIG. 17, an end portion of a plate-shaped heat equalizing member 21 is extended and bent in a direction opposite to a coil 20. As a result, since the magnetic flux concentration on the end portion of the heat equalizing member 21 can be reduced and a heat capacity of the end of the heat equalizing member 21 can be increased, the brazing between the heat transfer tube 11 and the connection pipes 12, 13 can be further thermally equalized.

Fifth Embodiment

Figure 18:
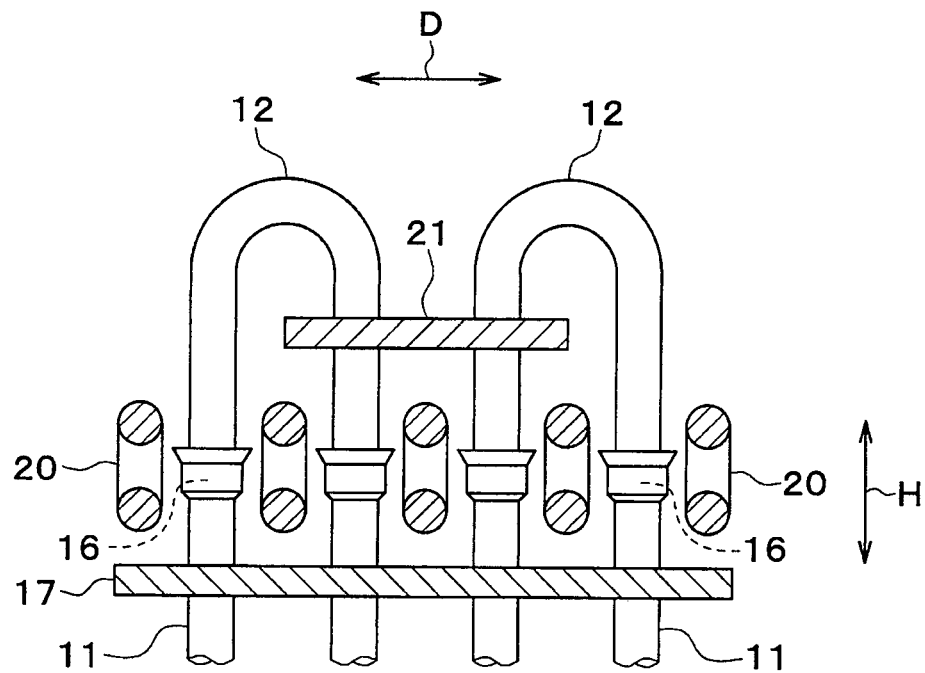
FIG. 18 is a partially enlarged front view of a heat exchanger according to a fifth embodiment of the present disclosure.

In the present embodiment, as shown in FIG. 18, a plate-shaped heat equalizing member 21 is not provided in the vicinity of heat transfer tubes 11 at both end rows, but is provided only in the vicinity of a heat transfer tube 11 in a center row.

According to the above configuration, since the heat equalizing member 21 provided in the vicinity of the heat transfer tube 11 in the center row is subjected to induction heating and generates a heat, a temperature of the heat transfer tube 11 in the center row having a small heat generation amount can be set to the same degree as that in the heat transfer tubes 11 on both end rows having a large heat generation amount. As a result, brazing between the heat transfer tube 11 and the connection pipes 12, 13 can be further thermally equalized.

Sixth Embodiment

Figure 19:
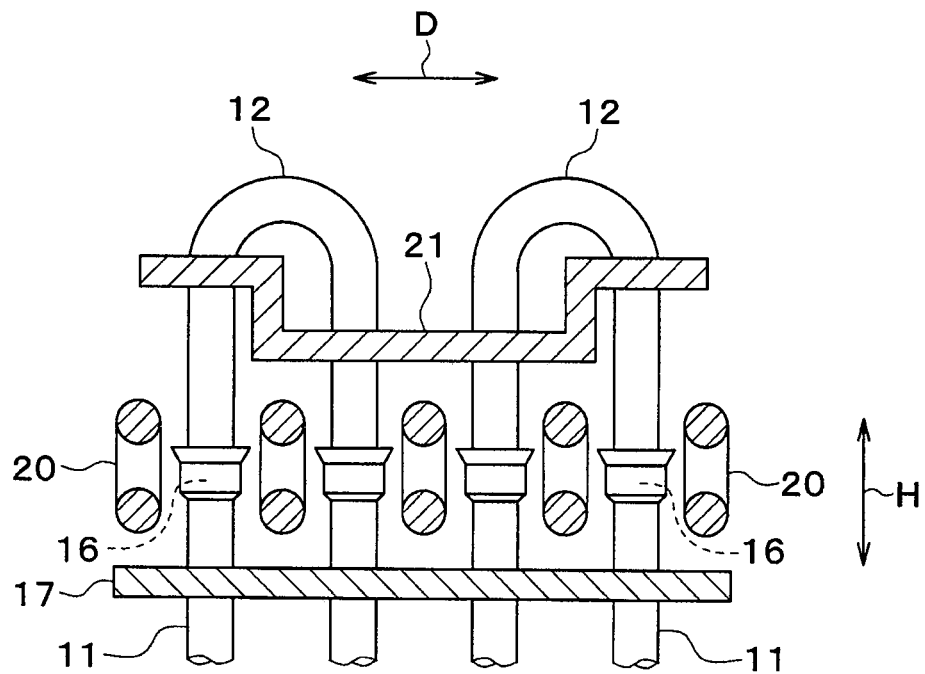
FIG. 19 is a partially enlarged front view of a heat exchanger according to a sixth embodiment of the present disclosure.

In the present embodiment, as shown in FIG. 19, a plate-shaped heat equalizing member 21 has a bent shape, and a center portion of the heat equalizing member 21 is located closer to the coil 20 than both side portions.

In the center portion of the heat equalizing member 21, a magnetic flux density is higher and the amount of heat generation is larger than the both end portions, the amount of heat transferred to the heat transfer tube 11 in the center row having a smaller heat generation amount is increased. As a result, since the heat transfer tubes 11 in the center row having a small heat generation amount can be brought to a temperature approximately equal to that of the heat transfer tubes 11 in the both end rows having a large heat generation amount, the brazing of the heat transfer tubes 11 and the connection pipes 12, 13 can be further thermally equalized.

Seventh Embodiment

Figure 20:
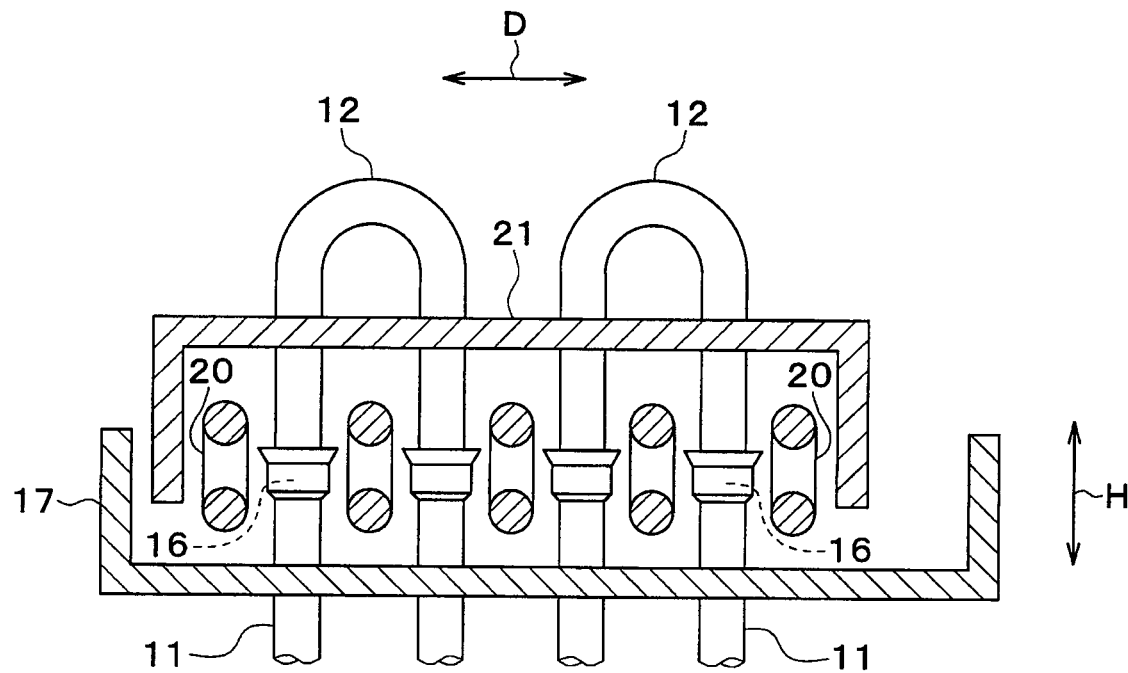
FIG. 20 is a partially enlarged front view of a heat exchanger according to a seventh embodiment of the present disclosure.

In the present embodiment, as shown in FIG. 20, both ends of a side plate 17 are bent toward connection pipes 12 and 13. Since an assembling position of the side plate 17 is varied due to a manufacturing error or the like, a distance between a heat transfer tube 11 of a shortest row and a bent portion of the side plate 17 also varies. When the distance between the heat transfer tube 11 of the shortest row and the bent portion of the side plate 17 is long, the heat transfer tube 11 in an endmost row has a high magnetic flux density and therefore becomes high temperature.

Therefore, in the present embodiment, an end portion of the heat equalizing member 21 is bent between a bent position of the side plate 17 and the coil 20. As a result, since the bent portion of the heat equalizing member 21 is subjected to induction heating, an influence of the side plate 17 can be eliminated and a stable heat equalizing property can be obtained.

Eighth Embodiment

Figure 21:
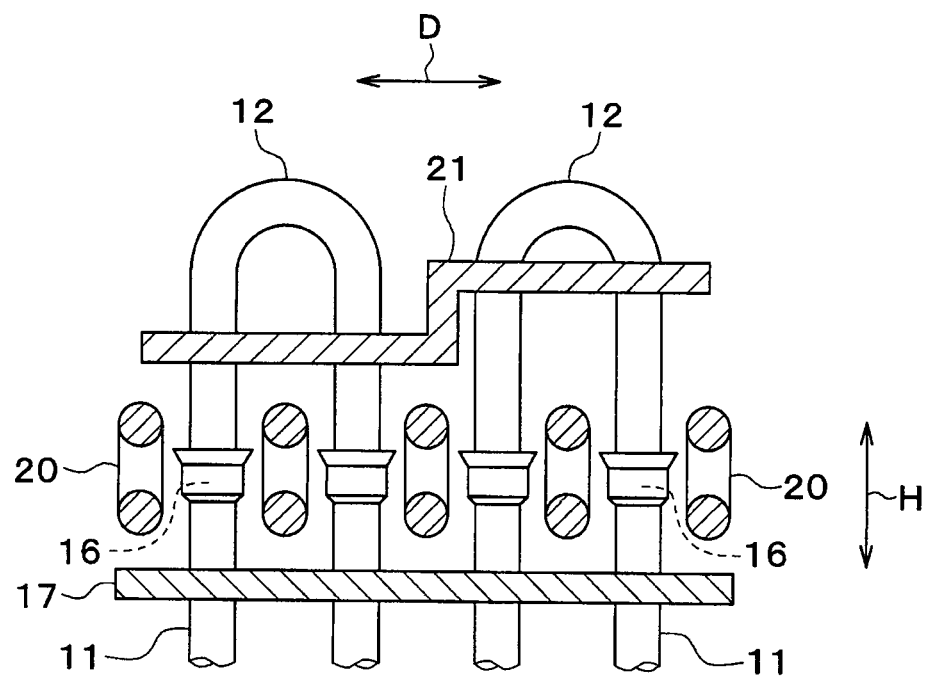
FIG. 21 is a partially enlarged front view of a heat exchanger according to an eighth embodiment of the present disclosure.

In the present embodiment, thicknesses of heat transfer tubes 11 are different from each other. In an example of FIG. 21, the thickness of the two heat transfer tubes 11 on the right side is smaller than the thickness of the two heat transfer tubes 11 on the left side.

A plate-shaped heat equalizing member 21 has a bent shape, and a portion of the heat equalizing member 21 on the side of the thin heat exchanger tube 11 is separated from a coil 20 as compared with a portion on the side of the thick heat transfer tube 11.

The portion of the heat equalizing member 21 on the side of the thin heat exchanger tube 11 has a lower magnetic flux density and a smaller heat generation amount than those of the thicker heat transfer tube 11 side portion. For that reason, since the temperature can be made uniform between the thin heat transfer tube 11 having a small heat capacity and the thick heat transfer tube 11 having a large heat capacity, brazing between the heat transfer tube 11 and the connection pipes 12, 13 can be further equalized.

Ninth Embodiment

In the present embodiment, thicknesses of heat transfer tubes 11 are different from each other. In an example of FIG. 22, the thickness of the two heat transfer tubes 11 on the right side is smaller than the thickness of the two heat transfer tubes 11 on the left side.

A portion of the plate-shaped heat equalizing member 21 on the thin heat transfer tube 11 side is folded back to be double. A portion of the plate-shaped heat equalizing member 21 on the thick heat transfer tube 11 side is not folded back to be single.

A heat capacity of a portion of the heat equalizing member 21 on the side of the thin heat transfer tube 11 is larger than that of a portion on the side of the thick heat exchanger tube 11 so that the amount of temperature rising is reduced. For that reason, since the temperature can be made uniform between the thin heat transfer tube 11 having a small heat capacity and the thick heat transfer tube 11 having a large heat capacity, brazing between the heat transfer tube 11 and the connection pipes 12, 13 can be further equalized.

Figure 22:
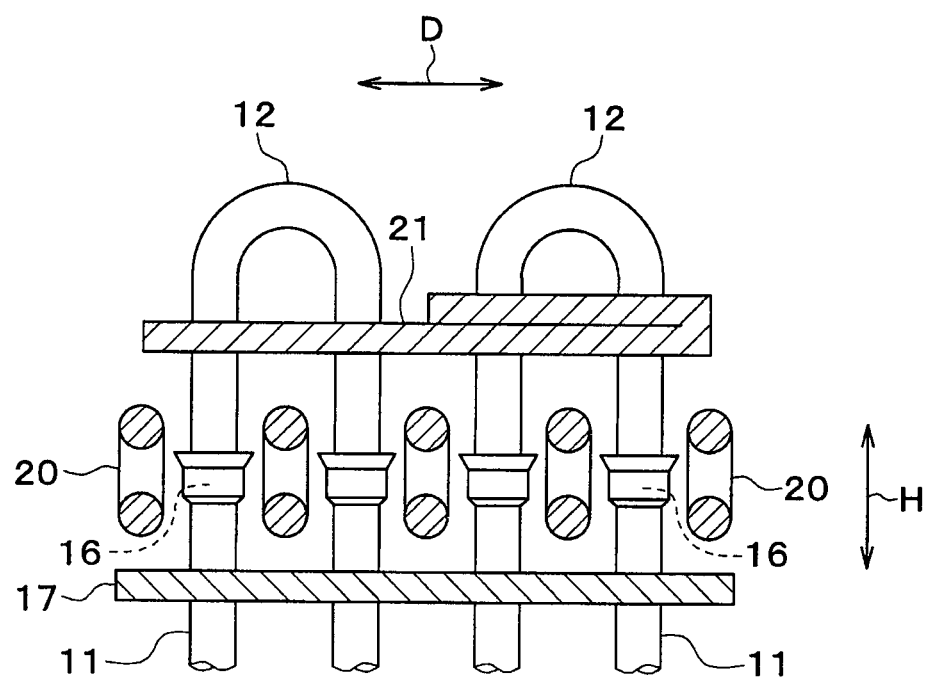
FIG. 22 is a partially enlarged front view of a heat exchanger according to a ninth embodiment of the present disclosure.

Even if the plate-shaped heat equalizing members 21 are doubled on the thin heat transfer tube 11 side and only one plate-like heat equalizing member 21 is formed on the thick heat transfer tube 11 side, the same operational effects as those in the example of FIG. 22 can be obtained.

Even if the plate thickness of the plate-like heat equalizing member 21 is different between portions, and the plate thickness of a portion of the plate-shaped heat equalizing member 21 on the thin heat transfer tube 11 side is larger than the plate thickness of a portion on the thick heat transfer tube 11 side, the same operational effects as those in the example of FIG. 22 can be obtained.

The aforementioned embodiments can be properly combined together.

For example, the aforementioned embodiments can be modified in various forms as described below.

(1) In the second embodiment, the peripheral portion of the hole 21a of the heat equalizing member 21 comes in contact with the outer peripheral surfaces of the connection pipes 12 and 13, but the peripheral portion of the hole 21a may come out of contact with the peripheral surface of the connection pipes 12 and 13.

In this case, the temperature variation of each of the joint target portions 16 is about 70° C., and the temperature variation is reduced by about 70° C. as compared with the comparative example without using the heat equalizing member 21.

(2) In the embodiments described above, the heat exchanger 10 is a refrigeration cycle heat exchanger for exchanging the heat between the refrigerant of the refrigeration cycle and the air, but the heat exchanger 10 may be various heat exchangers that exchange the heat between various heat media.

(3) In the first embodiment, the heat transfer tube 11 and the connection pipes 12, 13 are brazed by the line burner 30. In the second embodiment, the heat transfer tube 11 and the connection pipes 12, 13 are brazed by high frequency induction heating. Alternatively, the heat transfer tube 11 and the connection pipes 12, 13 may be brazed with the use of a heating method such as multi burners, infrared heating, microwave heating or the like.

In that case, if the heat conduction members similar to the heat equalizing members 21 and 22 in the embodiments described above are brought into contact with at least a part of the connection pipes 12 and 13, the connection pipes 12 and 13 transfer the heat to each other through the heat equalizing member 21. As a result, the temperature variation between the connection pipes 12 and 13 can be reduced. For that reason, since the brazing between the heat transfer tube 11 and the connection pipes 12, 13 can be thermally equalized, the brazing quality between the heat transfer tube 11 and the connection pipes 12, 13 can be enhanced.

The heat transfer tube 11 and the connection pipes 12, 13 may be joined together by torch brazing. In that case, if the same heat conduction member as that of the heat equalizing members 21 and 22 in the embodiments described above is brought into heat transferable contact with at least a part of the connection pipes 12 and 13, a preheating effect is obtained. Therefore, the brazing can be efficiently performed when the adjacent joints are continuously brazed.

Figure 23:
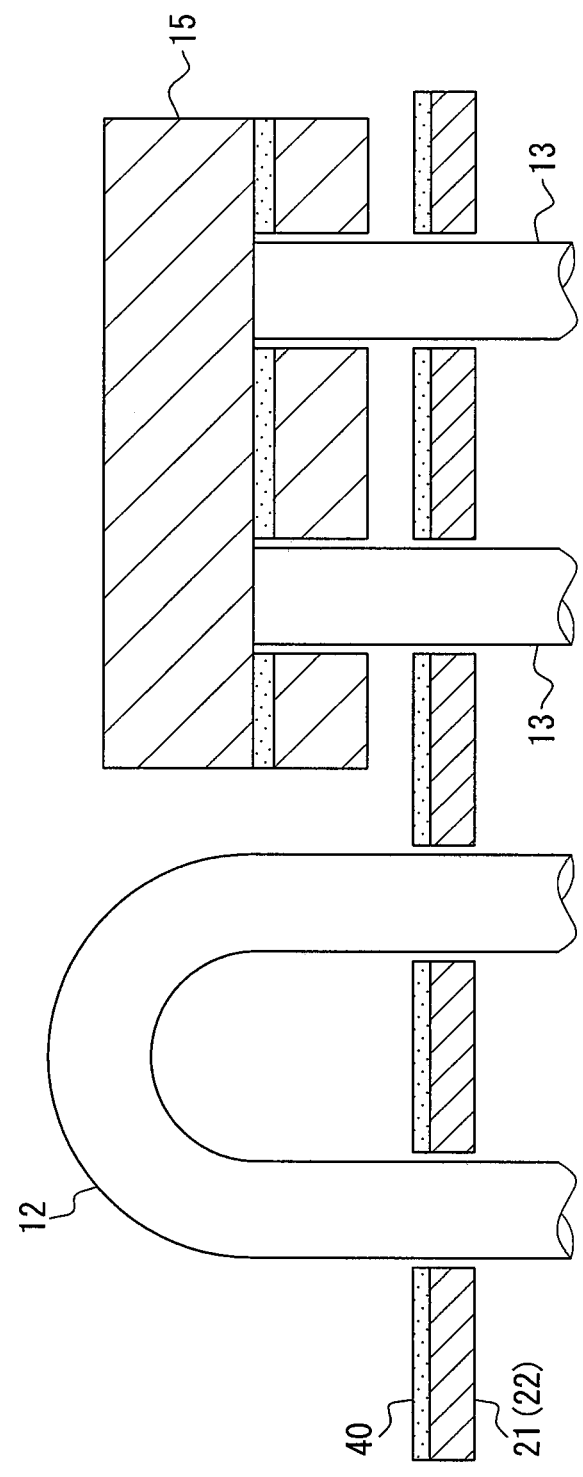
FIG. 23 is a partial cross-sectional view illustrating a part of a heat exchanger before brazing the connection pipes and the heat equalizing member according to a modification of the present disclosure.
Figure 24:
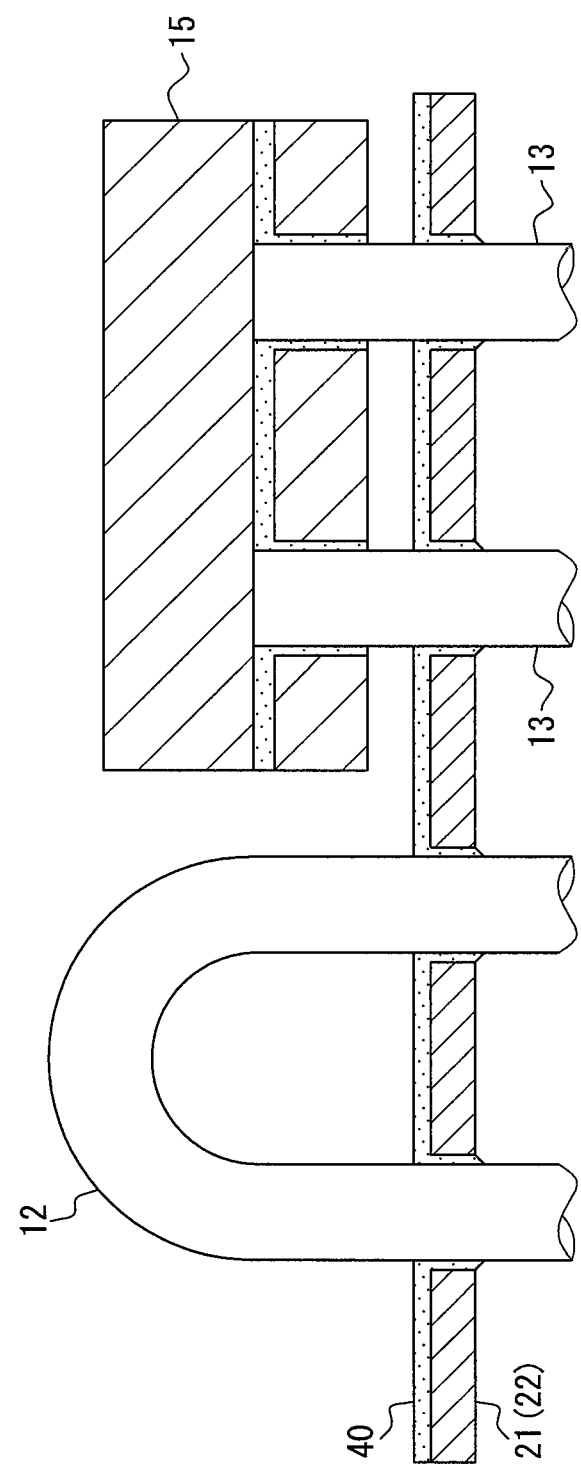
FIG. 24 is a partial cross-sectional view illustrating a part of a heat exchanger after brazing the connection pipes and the heat equalizing member according to a modification of the present disclosure.

In the embodiments described above, the connection pipes 12, 13 and the heat equalizing members 21, 22 are brazed together. For example, as shown in FIG. 23, the brazing material 40 may be clad on the surfaces of the heat equalizing members 21, 22 before brazing. In that case, the brazing material 40 clad on the surface of the heat equalizing members 21 and 22 is melted by heating and enters a gap between the connection pipes 12, 13 and the heat equalizing members 21, 22. As shown in FIG. 24, the connection pipes 12, 13 and the heat equalizing members 21, 22 are brazed together.

Figure 25:
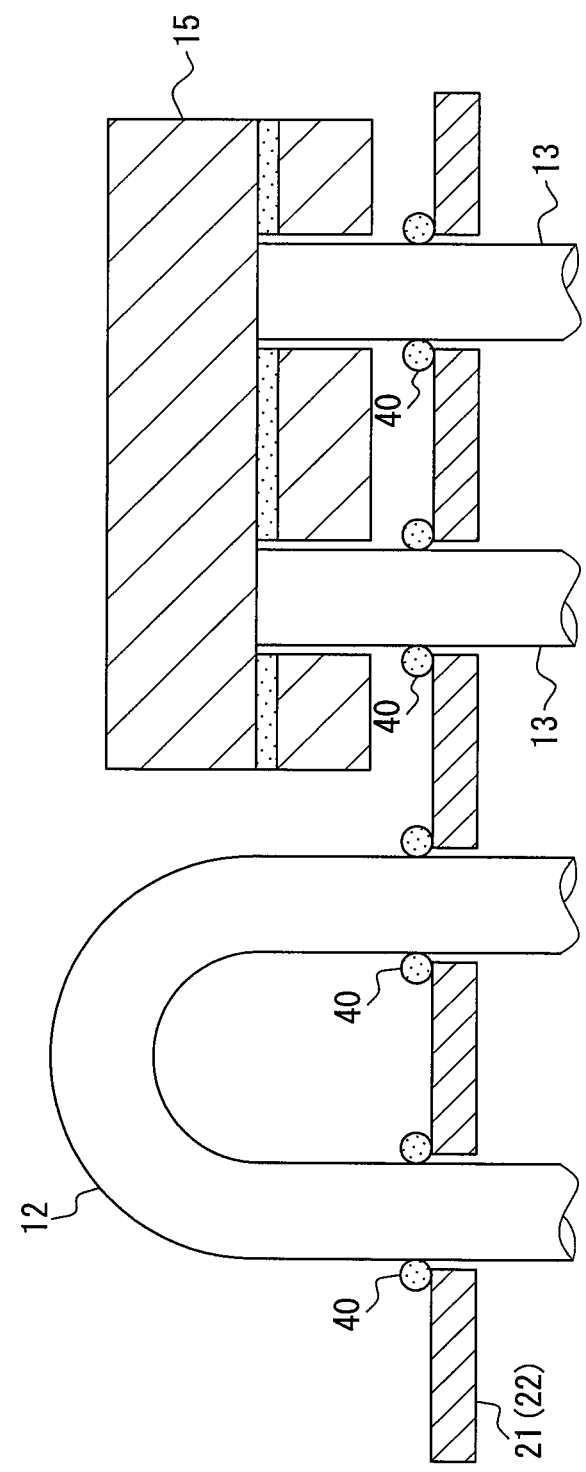
FIG. 25 is a partial cross-sectional view illustrating a part of a heat exchanger before brazing the connection pipes and the heat equalizing member according to a modification of the present disclosure.
Figure 26:
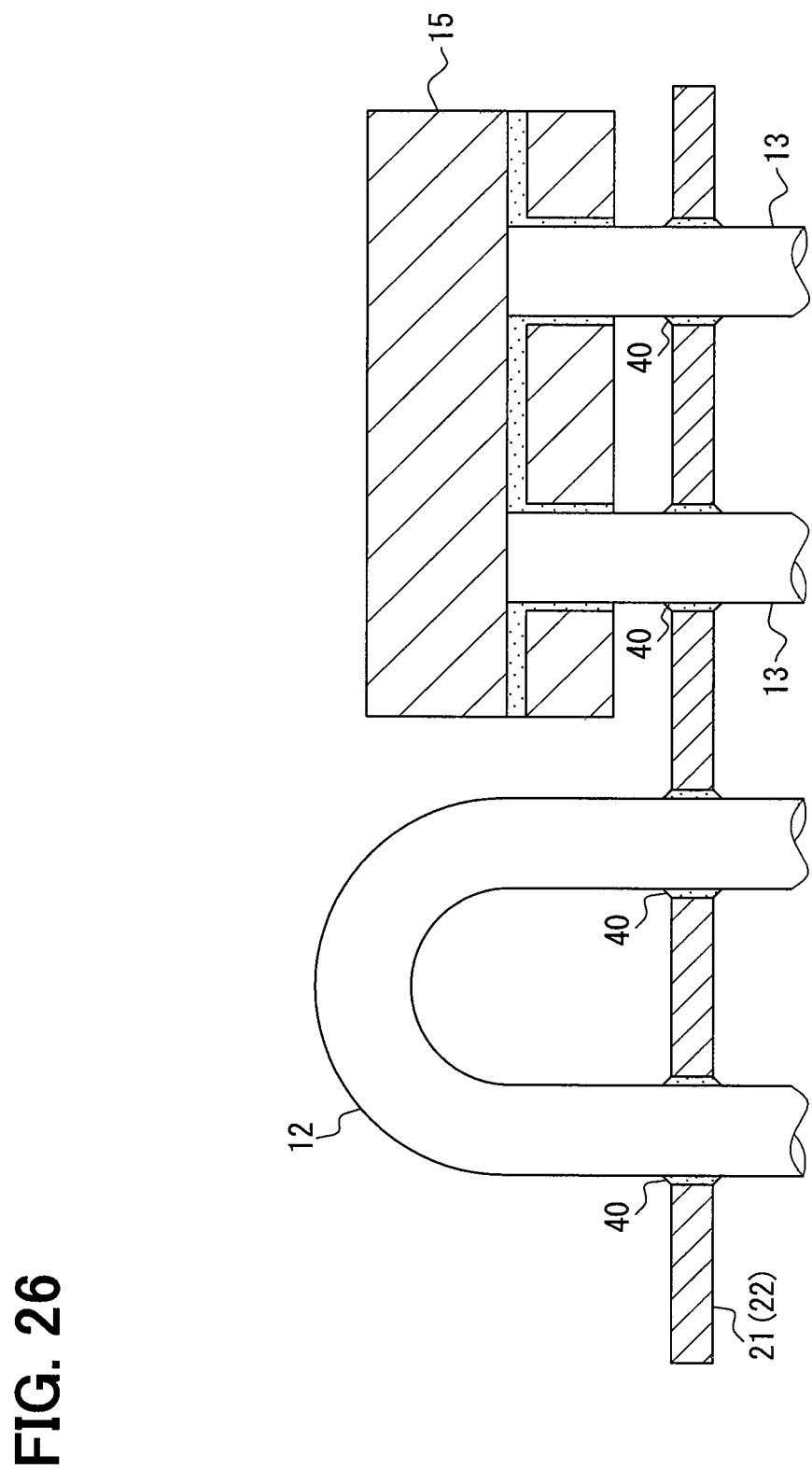
FIG. 26 is a partial cross-sectional view illustrating a part of a heat exchanger after brazing the connection pipes and the heat equalizing member according to a modification of the present disclosure.

Further, as shown in FIG. 25, a brazing material 40 having an annular shape (ring shape) may be attached to each of the connection pipes 12 and 13. In that case, the annular brazing material 40 around each of the connection pipes 12 and 13 is melted by heating and enters a gap between the connection pipes 12, 13 and the heat equalizing members 21, 22. As shown in FIG. 26, the connection pipes 12, 13 and the heat equalizing members 21, 22 are brazed together.

Figure 27:
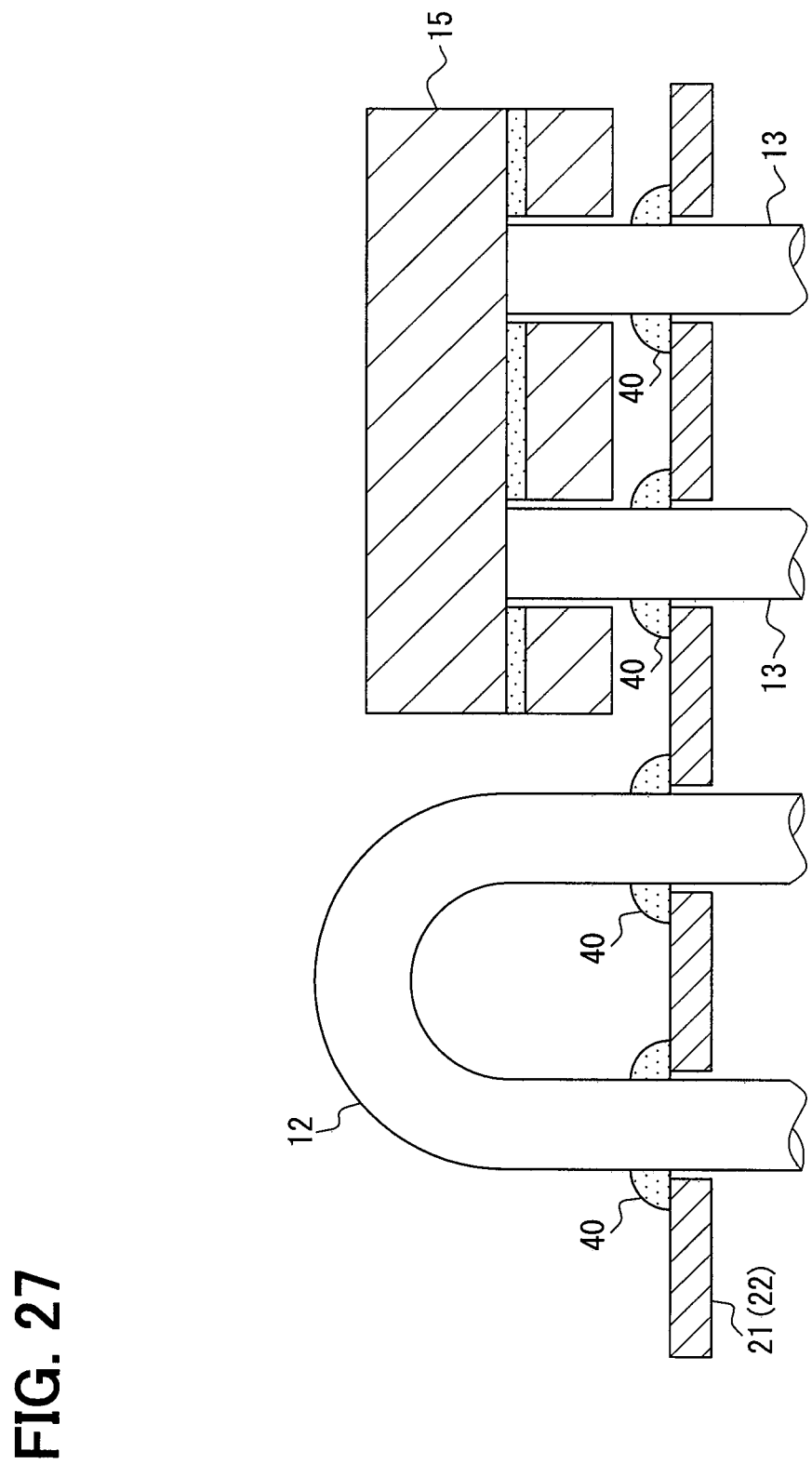
FIG. 27 is a partial cross-sectional view illustrating a part of a heat exchanger before brazing the connection pipes and the heat equalizing member according to a modification of the present disclosure.
Figure 28:
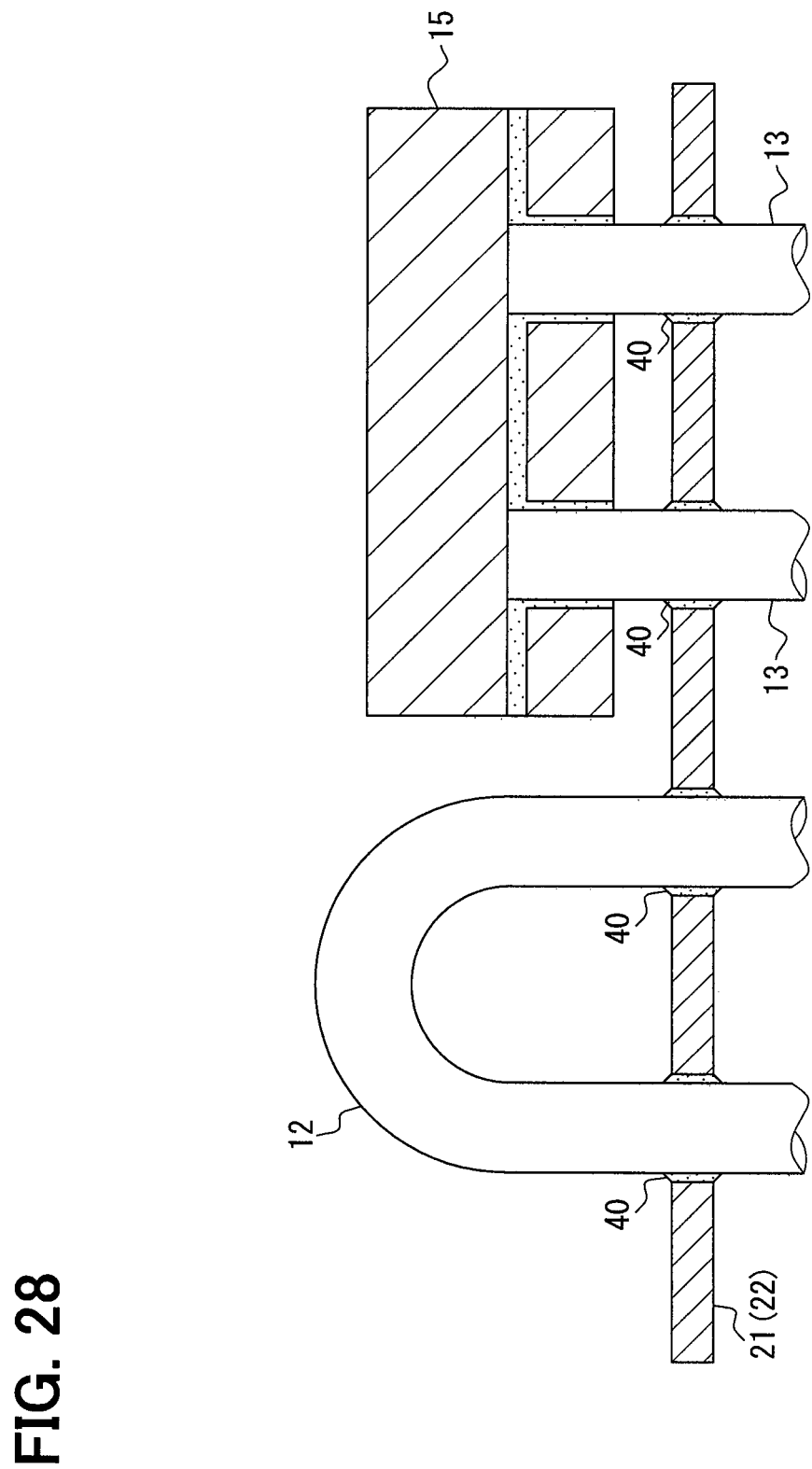
FIG. 28 is a partial cross-sectional view illustrating a part of a heat exchanger after brazing the connection pipes and the heat equalizing member according to a modification of the present disclosure.

Alternatively, as shown in FIG. 27, a paste-like brazing material 40 may be applied so as to come into contact with the outer peripheral surfaces of the respective connection pipes 12 and 13 and the surfaces of the heat equalizing members 21 and 22. In that case, the paste-like brazing material 40 around each of the connection pipes 12 and 13 is melted by heating and enters a gap between the connection pipes 12, 13 and the heat equalizing members 21, 22. As shown in FIG. 28, the connection pipes 12, 13 and the heat equalizing members 21, 22 are brazed together.

Figure 29:
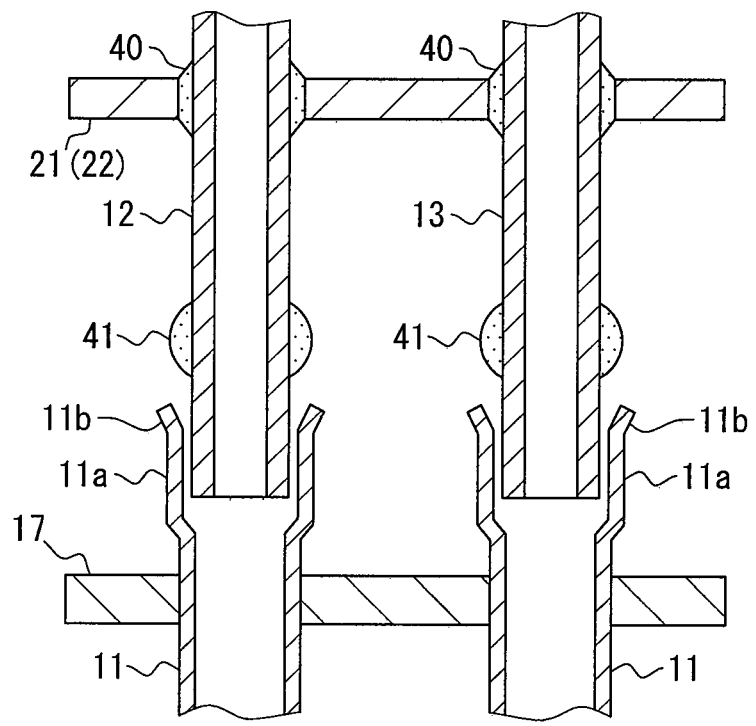
FIG. 29 is a partial cross-sectional view illustrating a heat exchanger before brazing the connection pipes and the heat transfer tubes according to a modification of the present disclosure.
Figure 30:
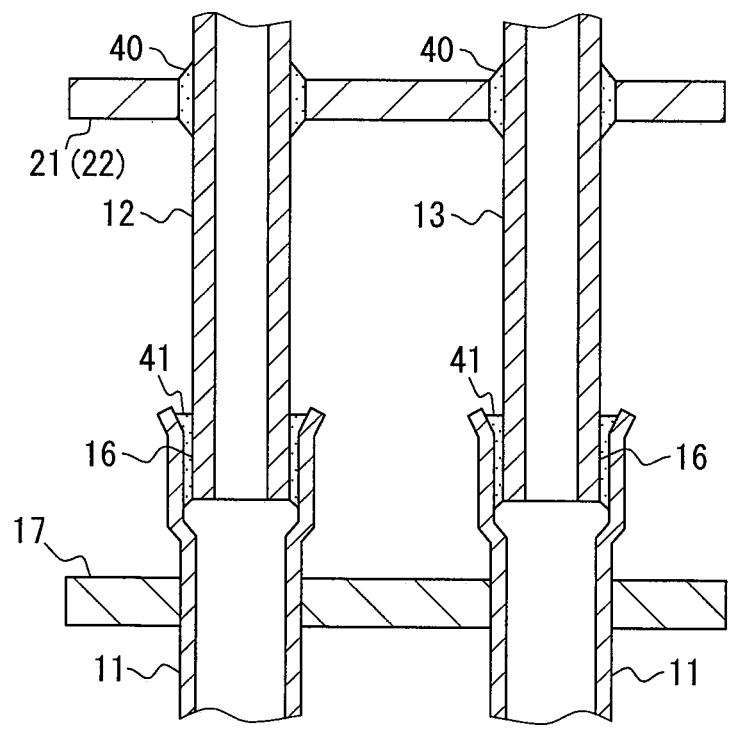
FIG. 30 is a partial cross-sectional view illustrating a heat exchanger after brazing the connection pipes and the heat transfer tubes according to a modification of the present disclosure.

In the embodiments described above, the heat transfer tube 11 and the connection pipes 12, 13 are brazed together. For example, as shown in FIG. 29, a paste-like brazing material 41 may be applied to the outer peripheral surfaces of the respective connection pipes 12 and 13 before brazing. In that case, the brazing material 41 on the outer peripheral surfaces of the respective connection pipes 12 and 13 is melted by heating and enters a gap between the heat transfer tubes 11 and the respective connection pipes 12, 13. As shown in FIG. 30, the heat transfer tube 11 and the connection pipes 12, 13 are brazed together.

Figure 31:
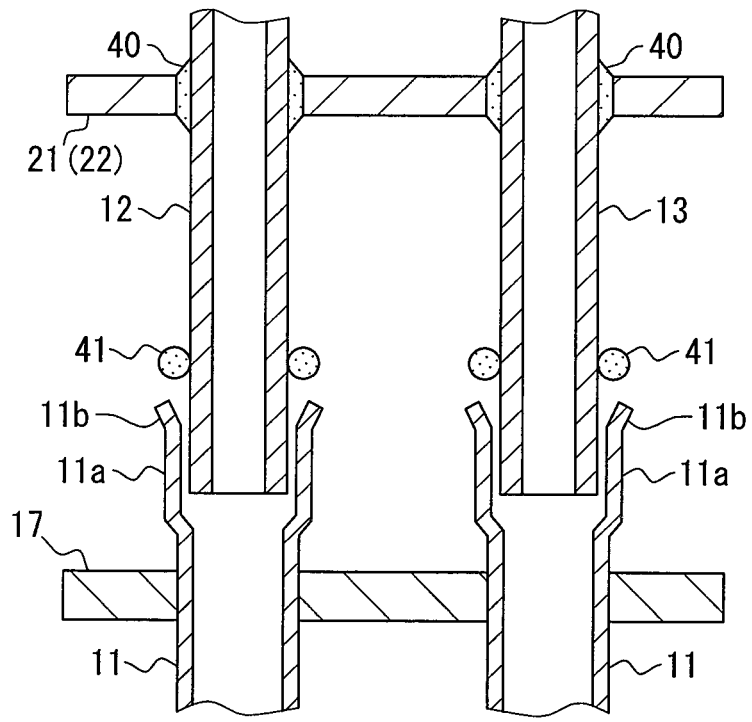
FIG. 31 is a partial cross-sectional view illustrating a heat exchanger before brazing the connection pipes and the heat transfer tubes according to a modification of the present disclosure.
Figure 32:
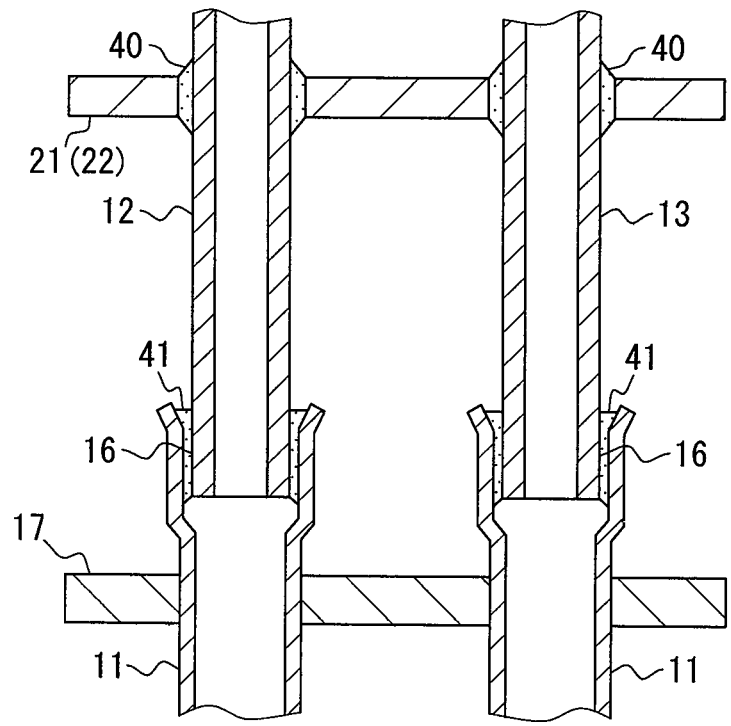
FIG. 32 is a partial cross-sectional view illustrating a heat exchanger after brazing the connection pipes and the heat transfer tubes according to a modification of the present disclosure.

Further, as shown in FIG. 31, the brazing material 41 having an annular shape (ring shape) may be attached to each of the connection pipes 12 and 13 before brazing. In that case, the annular brazing material 41 around the respective connection pipes 12 and 13 is melted by heating and enters a gap between the heat transfer tubes 11 and the respective connection pipes 12, 13. As shown in FIG. 32, the heat transfer tube 11 and the connection pipes 12, 13 are brazed together.

Figure 33:
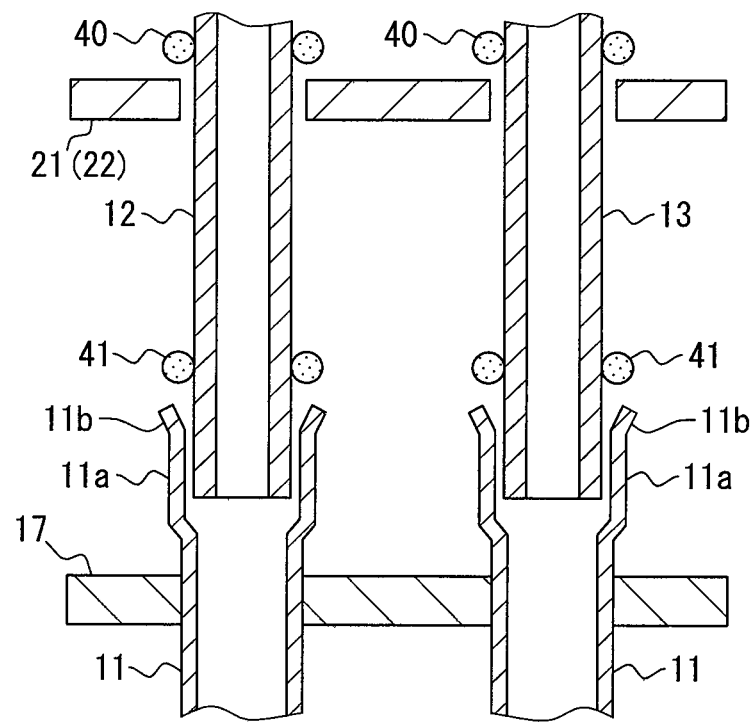
FIG. 33 is a partial cross-sectional view illustrating a heat exchanger before brazing the connection pipes, the heat equalizing member, and the heat transfer tubes according to a modification of the present disclosure.
Figure 34:
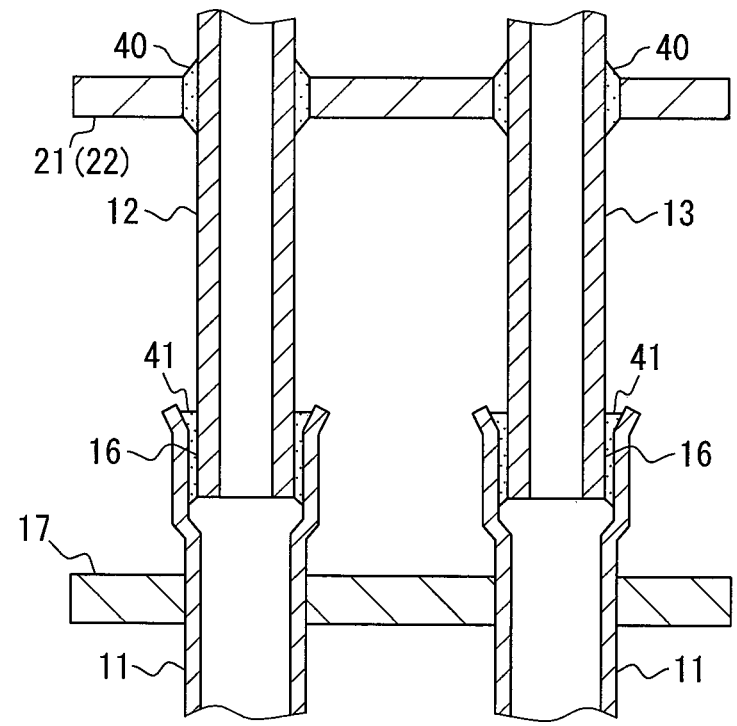
FIG. 34 is a partial cross-sectional view illustrating a heat exchanger after brazing the connection pipes, the heat equalizing member, and the heat transfer tubes according to a modification of the present disclosure.

Further, for example, as shown in FIG. 33, the brazing material 40 having an annular shape may be attached above the heat equalizing members 21 and 22 of the connection pipes 12 and 13, and the brazing material 41 having an annular shape may be attached above upper ends of the heat transfer tubes 11 of the respective connection pipes 12 and 13. In that case, the annular brazing materials 40 and 41 around the respective connection pipes 12 and 13 may be heated at the same time. As shown in FIG. 34, the heat transfer tube 11, the connection pipes 12, 13, and the heat equalizing members 21, 22 can be brazed at once. In this case, both of the brazing materials 40 and 41 may be the paste-like brazing material described above. While the present disclosure has been described with reference to embodiments thereof, it is to be understood that the disclosure is not limited to the embodiments and constructions. To the contrary, the present disclosure is intended to coat various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A heat exchanger comprising:
   a plurality of heat transfer tubes through which a heat medium flows, the plurality of heat transfer tubes being made of aluminum and arrayed side by side;
   a plurality of connection pipes through which the heat medium flows, the plurality of connection pipes being made of aluminum and brazed to end portions of the plurality of heat transfer tubes;
   a heat equalizing device formed of a heat conductor and disposed to be in contact at least partly with at least two of the plurality of connection pipes and be capable of transferring heat therebetween;
   a first filler being between and joining one of the plurality of heat transfer tubes and one of the plurality of connection pipes;
   a second filler being between and joining one of the at least two of the plurality of connection pipes and the heat equalizing device; and
   a side plate joined to the plurality of heat transfer tubes, wherein
   the first filler is lower in melting point than the second filler, and
   the side plate is located on an opposite side of the first filler from the heat equalizing device.

2. The heat exchanger according to claim 1, wherein the first filler contains one of an Al—Cu—Si material and an Al—Cu—Si—Zn material.

3. The heat exchanger according to claim 1, wherein the heat equalizing device and the plurality of connection pipes are in mechanical contact with each other.

4. The heat exchanger according to claim 1, wherein the plurality of heat transfer tubes are arrayed in three or more rows.

5. The heat exchanger according to claim 1, wherein the at least two of the plurality of connection pipes are different in shape from each other.

* * * * *